United States Patent
Kashioka

(10) Patent No.: US 8,446,616 B2
(45) Date of Patent: May 21, 2013

(54) IMAGE-FORMING APPARATUS, IMAGE-PROCESSING METHOD, AND CONTROL PROGRAM FOR EXECUTING THE SAME

(75) Inventor: Atsushi Kashioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1076 days.

(21) Appl. No.: 11/765,331

(22) Filed: Jun. 19, 2007

(65) Prior Publication Data

US 2007/0297017 A1    Dec. 27, 2007

(30) Foreign Application Priority Data

Jun. 23, 2006   (JP) ................................. 2006-173624

(51) Int. Cl.
*G06F 3/12* (2006.01)
(52) U.S. Cl.
USPC ......... 358/1.15; 358/1.13; 358/401; 358/448; 358/462; 358/501; 382/305; 382/306; 715/204; 715/208; 715/234; 715/239
(58) Field of Classification Search
USPC ............... 358/1.15, 1.13, 401, 448, 453, 462, 358/501, 538, 540; 705/14; 715/202, 201, 715/203, 204, 208, 230, 231, 233, 234, 239; 382/282, 305, 306
See application file for complete search history.

(56) References Cited

U.S. PATENT DOCUMENTS

| | | | |
|---|---|---|---|
| 5,638,504 A * | 6/1997 | Scott et al. ..................... | 715/202 |
| 6,876,759 B2 * | 4/2005 | Keller et al. .................. | 382/128 |
| 6,976,032 B1 | 12/2005 | Hull et al. | |
| 7,356,768 B1 * | 4/2008 | Levy et al. ..................... | 715/209 |
| 7,739,583 B2 * | 6/2010 | Barrus et al. .................. | 715/201 |
| 2003/0195802 A1 * | 10/2003 | Hensen et al. .................. | 705/14 |
| 2003/0200107 A1 * | 10/2003 | Allen et al. ...................... | 705/1 |
| 2006/0069983 A1 | 3/2006 | Bailey et al. | |
| 2006/0075337 A1 | 4/2006 | Jones et al. | |
| 2006/0080603 A1 | 4/2006 | Bailey et al. | |
| 2006/0136278 A1 | 6/2006 | Otsuka | |

FOREIGN PATENT DOCUMENTS

| | | |
|---|---|---|
| EP | 1643373 A2 | 4/2006 |
| JP | 2003-060956 A | 2/2003 |
| JP | 2004-056712 A | 2/2004 |
| JP | 2004-328451 A | 11/2004 |
| JP | 2005-086385 A | 3/2005 |
| JP | 2006-033406 A | 2/2006 |
| JP | 2006-126834 A | 5/2006 |
| KR | 2006-0049262 A | 5/2006 |

* cited by examiner

*Primary Examiner* — Vu B Hang
(74) *Attorney, Agent, or Firm* — Canon USA, Inc., I.P. Division

(57) ABSTRACT

An image-processing method for an image-forming apparatus communicating with a peripheral device is disclosed. The method includes scanning a document; generating data corresponding to the scanned document; obtaining data held by the peripheral device; forming display data for displaying the generated data and the data obtained from the peripheral device in association with each other; and sending the formed display data to an external information-processing apparatus.

5 Claims, 18 Drawing Sheets

| FIG. 9A |
| FIG. 9B |

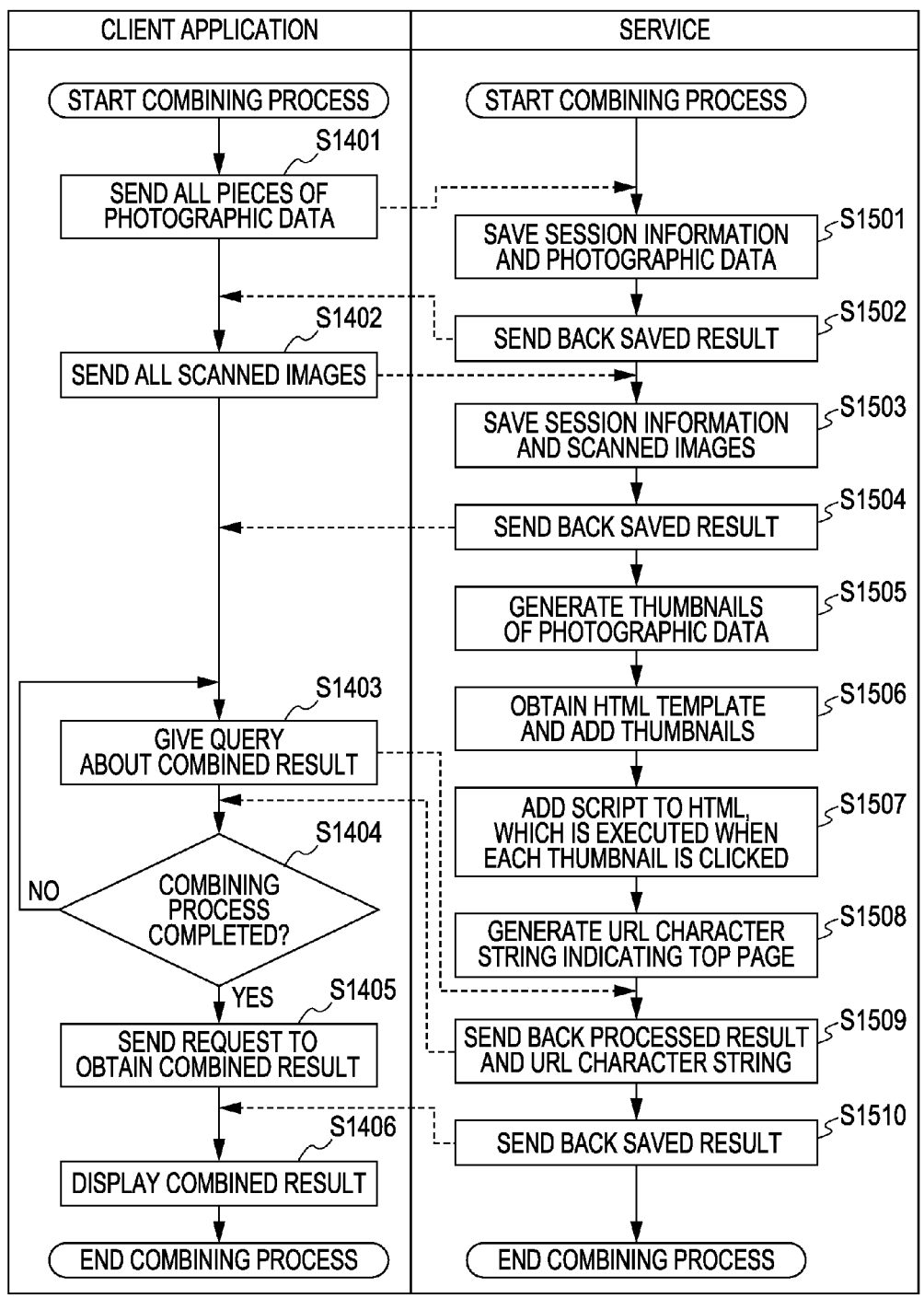

FIG. 13

```
<!DOCTYPE HTML PUBLIC" -//W3C//DTD HTML 4.01 Transitional//EN">
<HTML>
<HEAD>
<META http-equiv="Content-Type" content="text/html; charset=Shift_JIS">
<TITLE> INFORMATION REGISTERED BY XXXX ON APRIL 27, 2006 </TITLE>
</HEAD>
<FRAMESET cols="20%, 40%, 40%">
    <FRAME src="Thumbnail.html" name="Thumbnail">
    <FRAME src="" name="Picture">
    <FRAME src="" name="Document">
    <NOFRAMES>
        <BODY>
            <P>··············</P>
        </BODY>
    </NOFRAMES>
</FRAMESET>
</HTML>
```

1304 — `<TITLE>`
1305 — `<FRAMESET ...>`
1306 — `<FRAME src="Thumbnail.html" ...>`
1307 — `<FRAME src="" name="Picture">`
1308 — `<FRAME src="" name="Document">`

1300

```
<!DOCTYPE HTML PUBLIC" -//W3C//DTD HTML 4.01 Transitional//EN">
<HTML>
<HEAD>
<META http-equiv="Content-Type" content="text/html; charset=Shift_JIS">
<TITLE></TITLE>
<script language="JavaScript">       ADD SCRIPT EXECUTED WHEN EACH THUMBNAIL
<!--                                  OF PHOTOGRAPHIC DATA IS CLICKED
function Update() {
    parent.Picture.location.href = "Picture1.html" ;
    parent.Document.location.href = "Docment1.html" ;
}
-->
</script>
</HEAD>
<BODY>
<TABLE border= "0" >
    <TBODY>                          ADD THUMBNAIL OF PHOTOGRAPHIC DATA
        <TR>
            <TD><A href="JavaScript:Update() "><IMG src = "XX. JPG" width=
"200" alt = " PAGE 1" border = "0"></A></TD>
        </TR>
        <TR>
            <TD><center> PAGE 1 </center></TD>
        </TR>
        ·····························
```

1302 — script block
1303 — TD/IMG block

1301

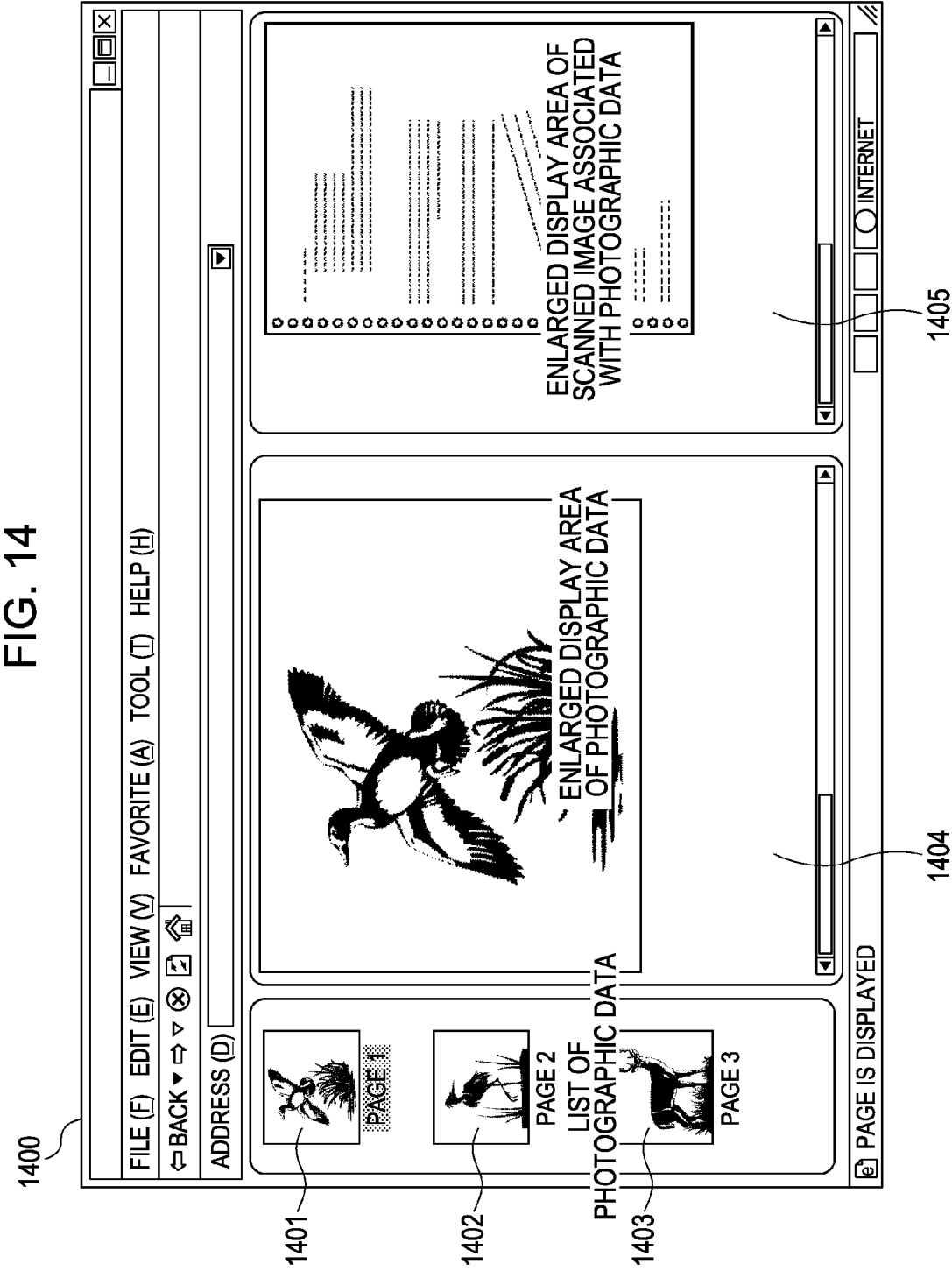

FIG. 16

```
<!DOCTYPE HTML PUBLIC" -//W3C//DTD HTML 4.01 Transitional//EN">
<HTML>
<HEAD>
<META http-equiv="Content-Type" content="text/html; charset=Shift_JIS">
<TITLE></TITLE>
<script language="JavaScript">
<!--  function Update1() {                                                    1601
            parent.Picture.location.href = "Picture1.html";
            parent.Document.location.href = "Document1.html";    }
      function Update2() {                                                    1602
            parent.Picture.location.href = "Picture2.html";
            parent.Document.location.href = "Document2.html";    }
      function Update3() {                                                    1603
            parent.Picture.location.href = "Picture3.html";
            parent.Document.location.href = "Document3.html";    }  -->
</script>
</HEAD>
<BODY>
<TABLE border= "0" >
        <TBODY>
                <TR><TD><A href="JavaScript:Update1() "><IMG src = "XXX. JPG" width="200"   1604
alt = " PAGE 1 "border = "0"></A></TD></TR>
                <TR>    <TD><center> PAGE 1 </center></TD><TR>
                <TR><TD><A href="JavaScript:Update2() "><IMG src = "YYY. JPG" width="200"   1605
alt = " PAGE 2 "border = "0"></A></TD></TR>
                <TR>    <TD><center> PAGE 2 </center></TD><TR>
                <TR><TD><A href="JavaScript:Update3() "><IMG src = "ZZZ. JPG" width="200"   1606
alt = " PAGE 3 "border = "0"></A></TD></TR>
                <TR> <TD><center> PAGE 3 </center></TD><TR>
        </TBODY>
</TABLE>
</BODY>
</HTML>
```

IMAGE-FORMING APPARATUS, IMAGE-PROCESSING METHOD, AND CONTROL PROGRAM FOR EXECUTING THE SAME

BACKGROUND OF THE INVENTION

1. Field of the Invention

The present invention relates to an image-forming apparatus for performing data communication with a peripheral device, and a method applicable to the same.

2. Description of the Related Art

People who work for newspaper and book publishers or people who work in the construction industry need means to speedily process photographs captured at a job site or obtained or generated documents or information and to share the information with other users. This may be implemented using a mobile terminal, such as a notebook personal computer (PC), to upload the information to a document management service (application service provider (ASP)) via the Internet so that the information may be shared among the users. Alternatively, a method of sending an email message with the information attached thereto has been discussed. However, the users do not necessarily carry information devices for implementing the above scheme. Since companies are taking more robust security measures, the users may not be permitted to carry information devices, such as personal digital assistants (PDAs), which have communication capability via the Internet, for fear of leaking information.

Japanese Patent Laid-Open No. 2006-33406 provides an exemplary solution to the above-described problem.

This patent document will now be described below. A paper document serving as an obtained or generated material is scanned by a multifunction peripheral (MFP) device. A list of scanned images is displayed on an operation panel. On the operation panel, a user selects a page(s) to send via email. The user adds a comment serving as information regarding the selected data. The MFP device adds the scanned image(s) to an email message and sends the email message to a PC or a cellular phone of another user with whom the user wants to share the information. In other words, the patent document describes the technique of combining a character string entered via the operation panel of the MFP device or a cellular phone with data scanned by the MFP device and sending the combined data from the MFP device.

In order to send data, the MFP device must attach the data to an email message. In the case that an email attachment protocol is used, the sending process is highly likely to be restricted according to the file size. In addition, the email destination and comment need to be entered from or saved in the cellular phone or entered from the MFP device. The comment must be entered using keys that are difficult to press. In short, the above scheme requires many preconditions. In the case that the receiver of the email message wants to share the file attached to the email message with a client PC or with many other users, the receiver must re-save the file in a document management apparatus. The receiver must save a necessary comment as additional index information.

SUMMARY OF THE INVENTION

The present invention provides a scheme for obtaining desired information by fetching data from a peripheral device and data from an image-forming apparatus as needed.

The present invention also provides a scheme for easily obtaining data that has a utility value by combining data from a peripheral device with data fetched from an image-forming apparatus.

According to an aspect of the present invention, there is provided an image-forming apparatus communicating with a peripheral device, including the following elements: a scanning unit configured to scan a document; a first generator configured to generate data corresponding to the document scanned by the scanning unit; an obtaining unit configured to obtain data held by the peripheral device; a forming unit configured to form display data for displaying the data generated by the first generator and the data obtained by the obtaining unit from the peripheral device in association with each other; and a sender configured to send the display data formed by the forming unit to an external information-processing apparatus.

Further features and advantages of the present invention will be apparent from the following description taken in conjunction with the accompanying drawings, in which like reference characters designate the same or similar parts.

BRIEF DESCRIPTION OF THE DRAWINGS

FIG. 12 is a flowchart of a process performed by the client application and the document management service for combining photographic data with a scanned image in the system of the embodiment.

FIG. 13 illustrates exemplary hypertext markup language (HTML) samples generated as a result of combining photographic data with a scanned image in the system of the embodiment.

FIG. 14 illustrates an exemplary user interface displaying an exemplary HTML document, which is generated as a result of combining pieces of photographic data with scanned images in the system of the embodiment, on a browser.

FIG. 16 illustrates exemplary display data in the embodiment.

DESCRIPTION OF THE EMBODIMENTS

An embodiment of the present invention will be described on the basis of the drawings. A user A at a job site outside the office captures photographs using a digital camera 30. These photographs are needed for his/her work, such as for interviews in a newspaper or magazine, or for checking the progress at a construction site. The user A, who wants to provide additional information, such as a detailed description or a report of the captured photographic data, uses the embodiment of the present invention to readily allow a user B to share the information or to present the information to the user B.

System Configuration

Figure 1:
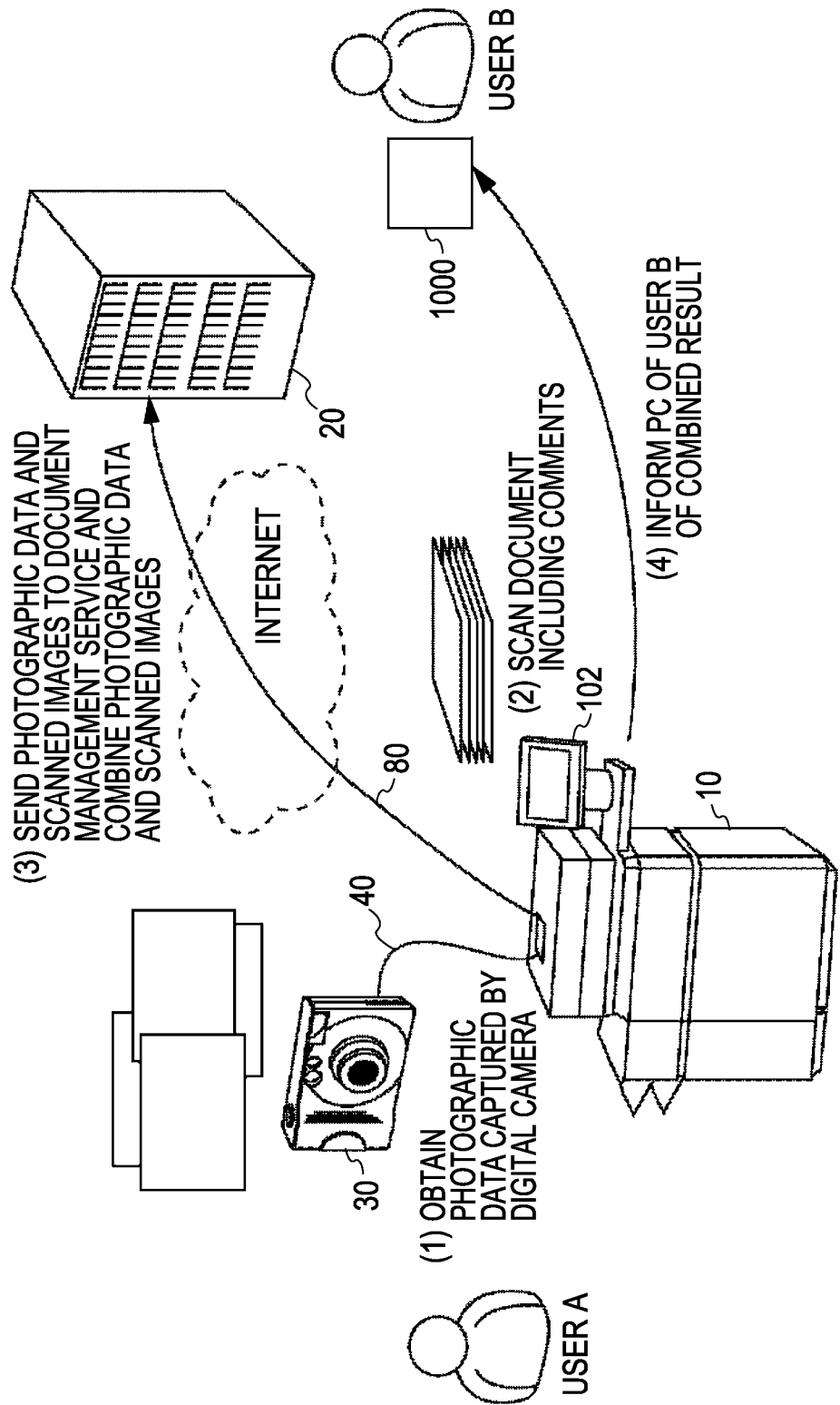
FIG. 1 is a diagram of the configuration of a system according to an embodiment of the present invention.

FIG. 1 is a diagram of the configuration of a data combining and registration system. An MFP device 10 containing a client application for the data combining/registration system according to the embodiment and a document management service device 20 for the data combining/registration system according to the embodiment are connected to each other via the Internet. In other embodiments, the document management service device 20 and the MFP 10 may be connected to each other via an intranet, for example via a LAN. The MFP device 10 is connected to the digital camera 30 via a wireless-communication unit interface 40. In other embodiments, the interface 40 may be wired, such as via universal serial bus (USB) or the like.

Further, in other embodiments, the digital camera 30 may be replaced by another peripheral device such as a cellular phone with a camera or various removable memories, such as USB memories, storing data to be registered in the document management service device 20.

Figure 2:
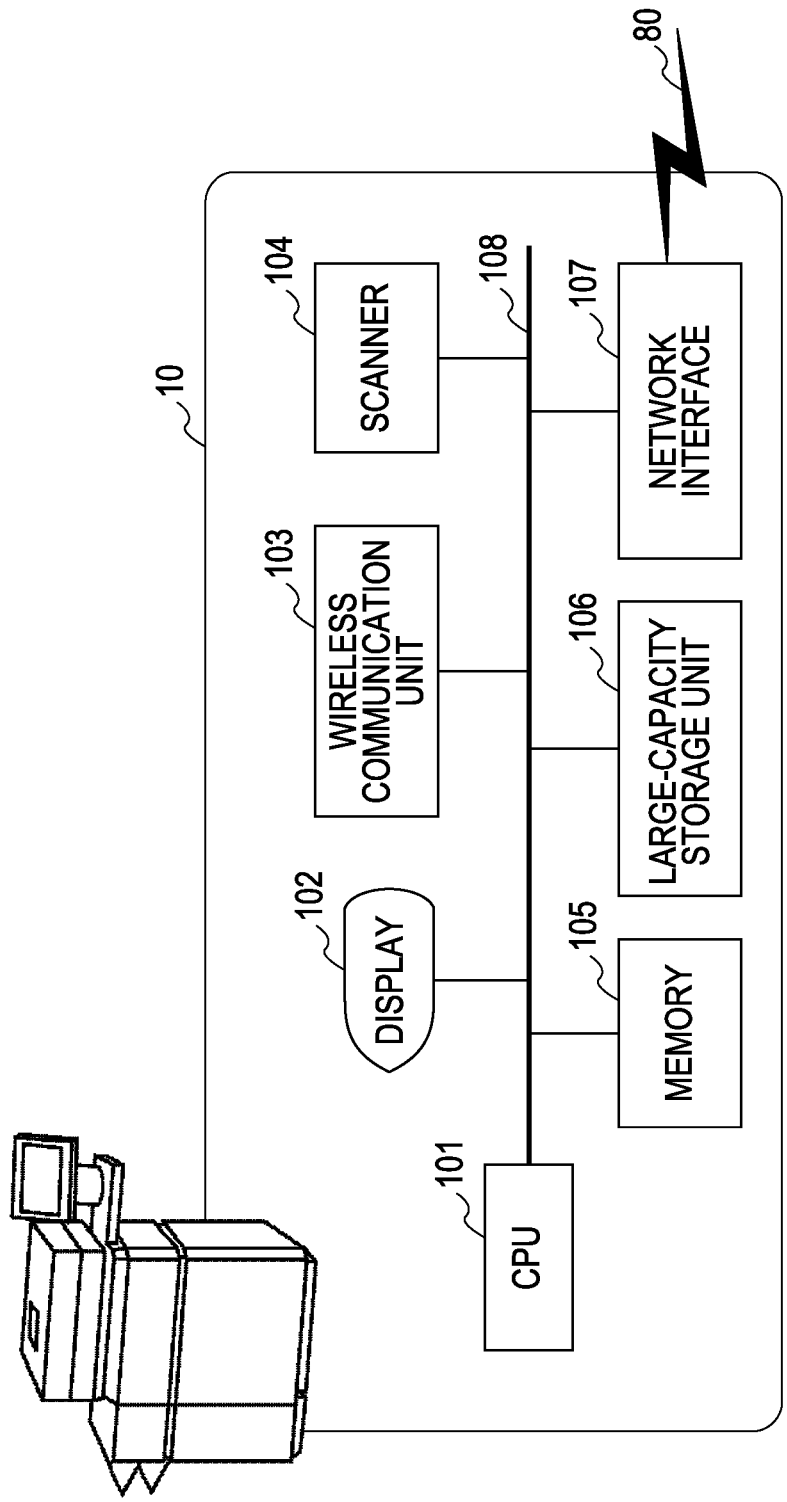
FIG. 2 is a block diagram of an exemplary MFP device in the system of the embodiment.

FIG. 2 is a block diagram of an example of the MFP device 10 for implementing the data combining/registration system according to the embodiment. Referring to FIG. 2, a central processing unit (CPU) 101 connects to various functions and devices, which will be described later, via an internal bus 108. The CPU 101 is configured to control the MFP device 10.

A display 102 is a device for displaying a user interface on a touch panel (operation panel) or the like. An instruction given from the user A is input from the user interface displayed on the display 102 on which user operations are entered to perform desired processes.

Figure 15:
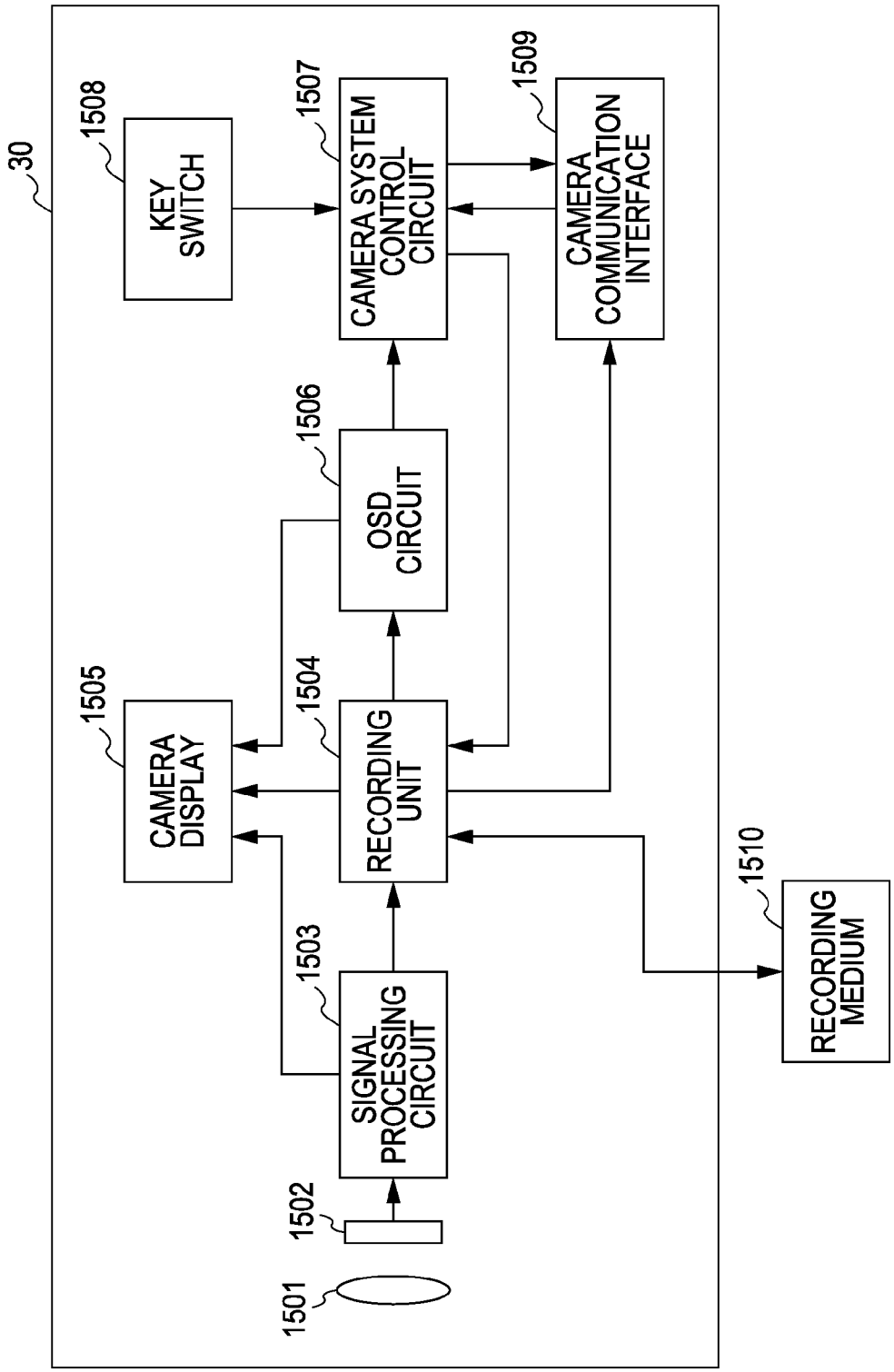
FIG. 15 is a diagram of the hardware configuration of a digital camera.

FIG. 15 shows the structure of the digital camera 30 of the embodiment.

Referring to FIG. 15, the digital camera 30 includes an imaging lens 1501 and an image-pickup element 1502. The digital camera 30 further includes a signal-processing circuit 1503, a recording unit 1504, a camera display 1505, an on-screen display (OSD) circuit 1506, a camera system control circuit 1507, and a key switch 1508. Furthermore, the digital camera 30 includes a camera communication interface 1509.

A recording medium 1510 is a medium, such as a memory card, in which images captured by the digital camera 30 can be recorded or from which the recorded images can be read.

An optical image formed by the imaging lens 1501 is converted by the image-pickup element 1502, such as a charge-coupled device (CCD) or the like, into an electric charge signal, whereby an image is captured. The electric charge signal generated by conversion is processed by the signal-processing circuit 1503 into a predetermined image signal. The image signal processed by the signal-processing circuit 1503 is output to the recording unit 1504 and the camera display 1505. If necessary, the image signal is stored in the recording medium 1510. The recording medium 1510 is a removable storage medium.

The recording unit 1504 performs input/output processes for controlling recording and reading of the image signal, which is output from the signal-processing circuit 1503, to/from the recording medium 1510. In accordance with the read image signal and information from the camera system control circuit 1507, the recording unit 1504 performs displaying and printing. To this end, the image signal is output to the camera display 1505 and the camera communication interface 1509.

The camera communication interface 1509 corresponds to short-range wireless communication or USB. The camera communication interface 1509 can communicate with a wireless-communication unit 103 shown in FIG. 2 using short-range wireless communication. As shown in FIG. 1, the camera communication interface 1509 can establish connection and communicate with the MFP device 10 shown in FIG. 2 using the interface 40, such as USB. In that case, the wireless-communication unit 103 may be replaced with a USB, or an additional USB interface may be provided. The digital camera 30 is placed closer to the wireless-communication unit 103. In response to this, a login accepting process shown in FIGS. 9A and 9B may start in the system according to the embodiment.

Preferably, the communication may start in the case that the camera communication interface 1509 becomes close enough to the wireless-communication unit 103 shown in FIG. 2, and in response to an instruction given from the MFP device 10. Alternatively, a short-range wireless communication unit may be replaced with a wired USB interface. In this case, in response to establishment of a USB connection, the MFP device 10 may communicate with the digital camera 30. In response to the establishment of communication, stored image data is sent from the digital camera 30 to the MFP device 10. The sending of the image data is executed by the camera system control circuit 1507 using the camera communication interface 1509 and a network interface 107.

Figure 3:
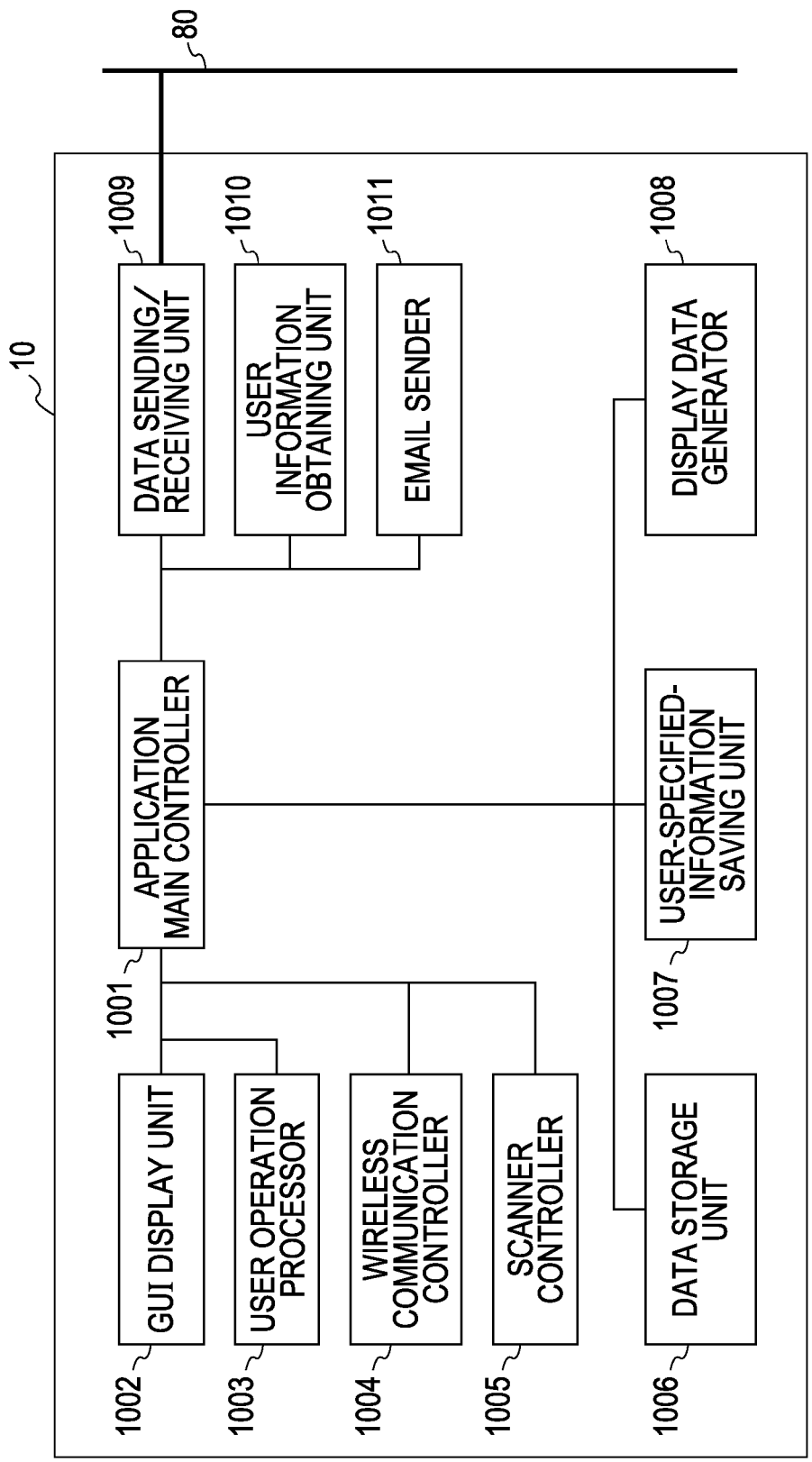
FIG. 3 is a diagram of the configuration of software running on the MFP device in the system of the embodiment.

In the embodiment, communication has been established between the MFP device 10 and the digital camera 30. No content is displayed on the camera display 1505 while a graphical user interface (GUI) display unit 1002 shown in FIG. 3 is operating. In the case that the camera display 1505 is activated by an input from the GUI display unit 1002 shown in FIG. 3, electricity is supplied to a panel of the camera display 1505.

The key switch 1508 is an input interface which includes a plurality of switches and initiates various operations on the digital camera 30, such as recording, reading, and printing of images. Key operation information is sent to the camera system control circuit 1507.

In the embodiment, communication between the digital camera 30 and the MFP device 10 involves sending of an image signal of an image to be printed, which is read from the recording medium 1510, from the digital camera 30 to the MFP device 10.

The camera display 1505 includes a liquid crystal display (LCD) or the like and displays information, such as an image signal input from the signal-processing circuit 1503 or the recording unit 1504, or characters input from the OSD circuit 1506.

The camera system control circuit 1507 outputs information to the processing units of the digital camera 30 in accordance with operation information, such as execution of image recording, image playback, or printing, input from the key switch 1508. To record or play an image, the camera system control circuit 1507 outputs a control signal for reading/writing an image signal from/to the recording medium 1510 to the recording unit 1504. The camera system control circuit 1507 outputs a control signal, such as a signal for starting or ending communication with the MFP device 10 in a print process, to the camera communication interface 1509. The camera system control circuit 1507 outputs display data indicating the state of the print process, which includes a predetermined user interface screen configuration and character information using a language code, to the OSD circuit 1506.

Figure 4:
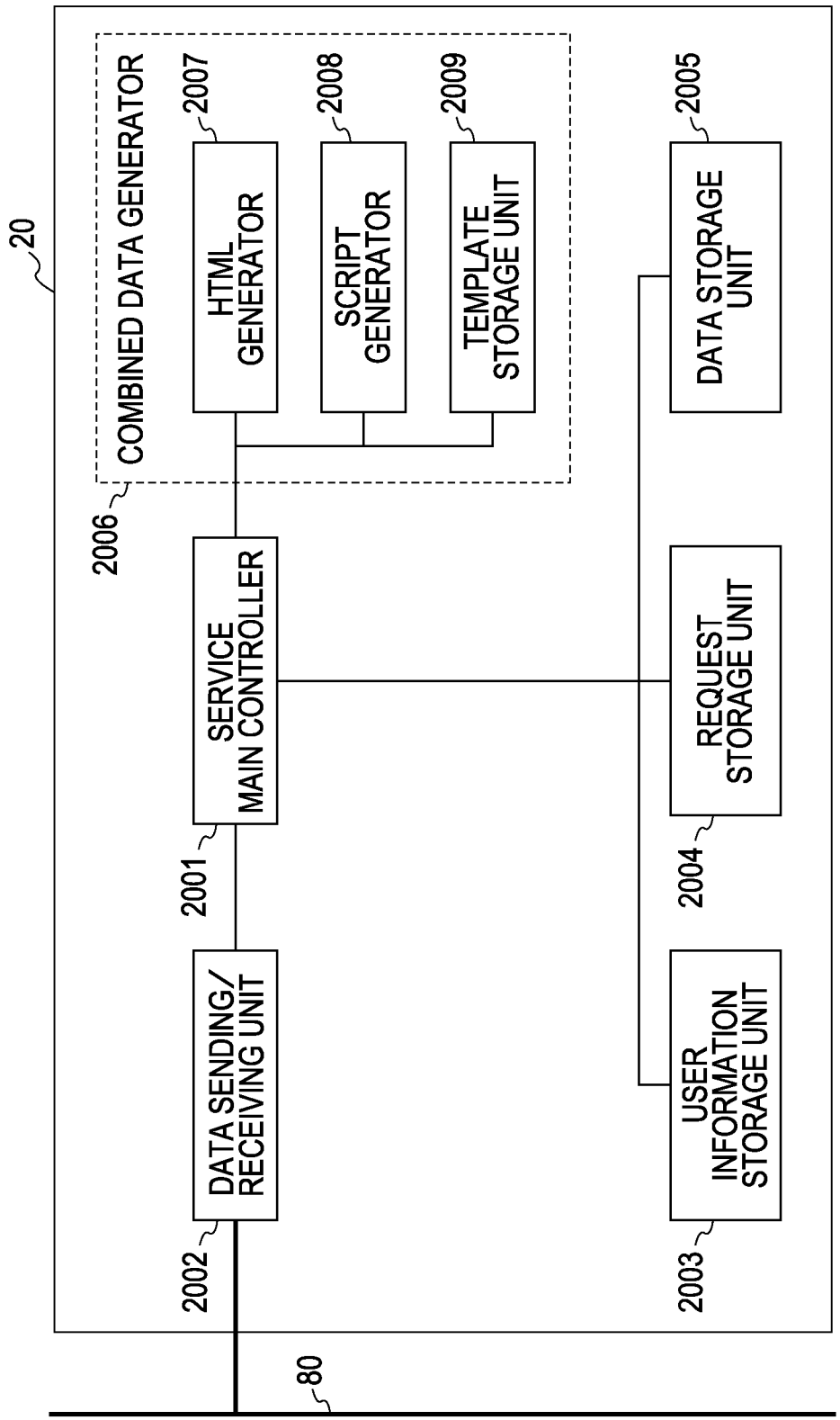
FIG. 4 is a software configuration diagram of an exemplary document management service in the system of the embodiment.
Figure 17:
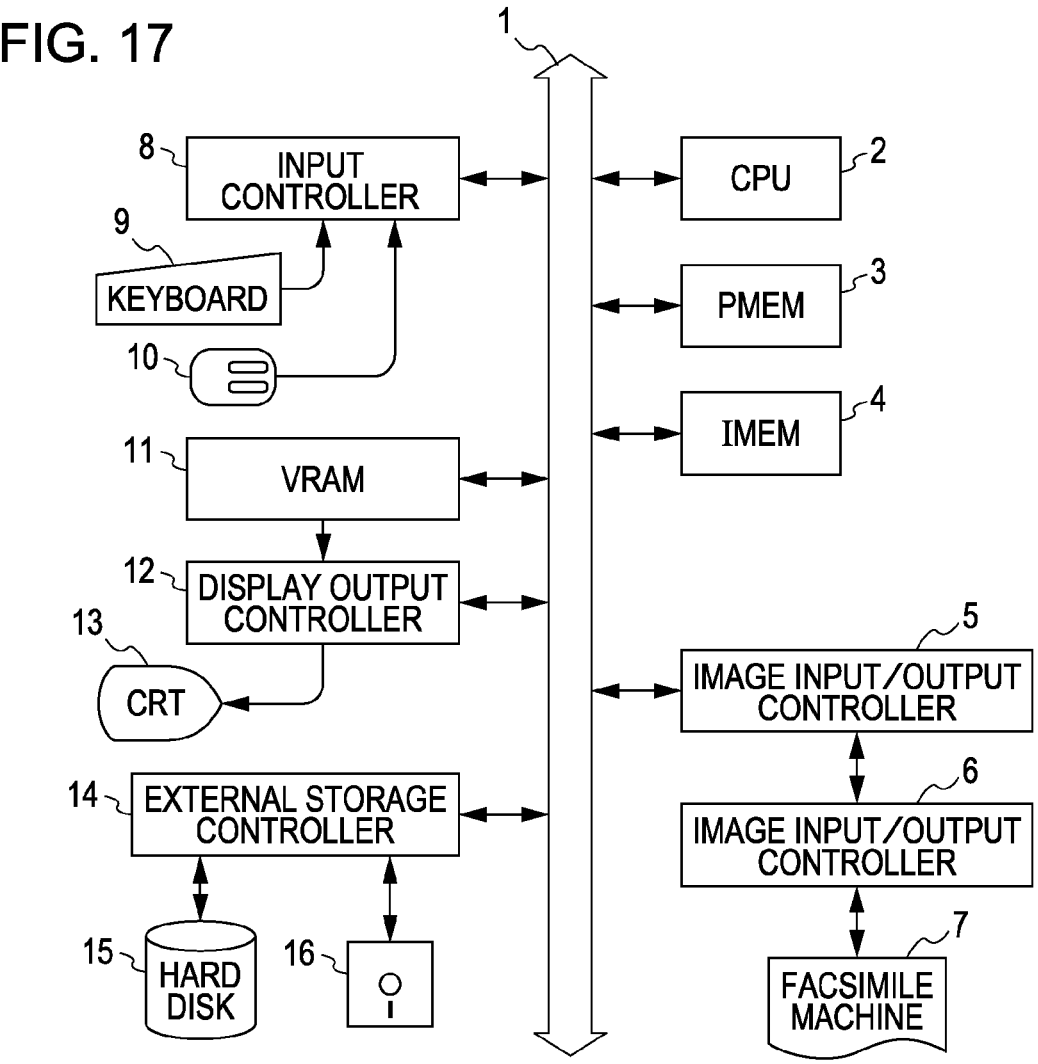
FIG. 17 is a diagram of an exemplary document management service device of the embodiment.

FIG. 17 is a hardware configuration diagram of the document management service device 20 according to the embodiment. A system bus 1 is shown in FIG. 17. Programs for implementing configuration block units 2001 to 2009, which will be described later with reference to FIG. 4, are stored in a hard disk 15. If needed, the programs are read and executed by a CPU 2.

The elements shown in FIG. 17 are connected to the system bus 1. The CPU 2 executes processes in accordance with control programs stored in a program memory (hereinafter abbreviated as "PMEM") 3, the hard disk 15, and a floppy disk® 16. The PMEM 3 appropriately selects or reads in programs for executing the document management service from the hard disk 15. The programs are executed by the CPU 2. Data entered using a keyboard 9 is stored as code information in the PMEM 3 serving also as a text memory. An image memory (hereinafter abbreviated as "IMEM") 4 stores image data. An image input/output controller 5 controls input/output of image data and user setting information from/to a facsimile machine 7. A main unit of the facsimile machine 7 has an image input/output controller 6. The user setting information read from the facsimile machine 7 is stored in the PMEM 3 and converted to a display format, which is then expanded on a video random access memory (VRAM) 11 and displayed on a cathode-ray tube (CRT) 13. The document data to be sent is expanded as bitmap data on the IMEM 4, and thereafter, the document data is output, together with function specifying information, to the image input/output controller 6 of the main unit of the facsimile machine 7 under control of the image input/output controller 5. An input controller 8 is connected to input units, such as the keyboard 9 and a pointing device (hereinafter abbreviated as "PD") 10. An operator operates the keyboard 9 to give a system operation instruction or the like. The PD 10 is configured to allow entry of an instruction to select or process image information, graphic data, text data, or numeric data on the CRT 13. In the embodiment, a mouse is used as the PD 10. Accordingly, a mouse cursor on the CRT 13 is arbitrarily moved in the X and Y directions to select a menu or to select and edit the image data, graphic data, text data, or numeric data. A display output controller 12 is also shown in FIG. 17. Data displayed on the CRT 13 has been expanded as bitmap data on the VRAM 11. For example, in the case of graphic data, a graphic pattern corresponding to the position and attribute information is expanded on the VRAM 11. Under software control, a cursor may be directly generated and displayed in a display area of the VRAM 11. An external storage controller 14 and the data file disks 15 and 16 for recording image data, graphic data, text data, or numeric data are also shown in FIG. 17. The file disk 15 is, for example, the hard disk 15, and the file disk 16 is, for example, the floppy disk® 16. The hard disk 15 or the floppy disk® 16 stores control programs, such as programs for implementing the document management service. A network interface (NIF) is hardware for controlling a network interface. Data or image data processed by the CPU 2 is output via the NIF to a network 80. The NIF receives data from the network 80, and the received data is processed by the CPU 2.

Figure 18:
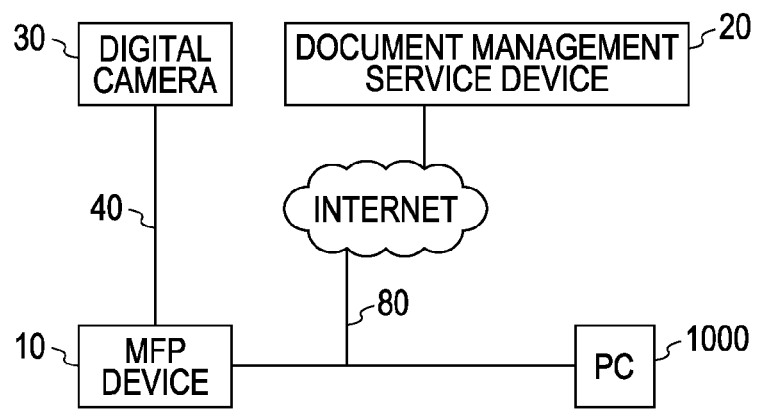
FIG. 18 is a diagram of an exemplary configuration of the system of the embodiment shown in FIG. 1.

FIG. 18 shows an exemplary configuration of the system, which is shown in FIG. 1, according to the embodiment. The digital camera 30 communicates with the MFP device 10 via the interface 40. The interface 40 may provide short-range wireless communication or may be a serial communication medium including a USB medium, or a medium such as the Centronics interface. The MFP device 10 communicates with a PC 1000 via the network 80. As has been described above, as shown in FIG. 18, the document management service device 20 communicates with the PC 1000 or the MFP device 10 via the Internet and the network 80.

FIG. 2 will now be described below. The wireless-communication unit 103 is configured to communicate with the digital camera 30 and to obtain photographic data from the digital camera 30. A scanner 104 has a function, such as an automatic document feeding function, and is configured to scan a document.

A memory 105 stores various commands (application programs) to be executed by the CPU 101 to control the MFP device 10. A client application according to the embodiment is also loaded into the memory 105 and executed.

A large-capacity storage unit 106 stores the actual program of the client application according to the embodiment, the photographic data obtained from the digital camera 30, and scanned images scanned by the scanner 104. Under control of the CPU 101, the network interface 107 sends and receives signals via the Internet. In particular, the network interface 107 is used to communicate with the document management service device 20 in the embodiment.

The client application may be saved in advance in the large-capacity storage unit 106. Alternatively, the client application may be dynamically downloaded via the network interface 107 and stored in the large-capacity storage unit 106.

Outline of Process

The flow of a process performed in the data combining/registration system will now be described below.

FIG. 3 is a software configuration diagram showing an exemplary client application running on the MFP device 10 in the data combining/registration system according to the embodiment. FIG. 4 is a software configuration diagram showing an example of the interior of the document management service device 20 in the data combining/registration system according to the embodiment. Although the MFP device 10 is described in the embodiment, any peripheral device may be used as long as the peripheral device has an image input function by means of scanning and a storage unit.

Figures 9, 9A:
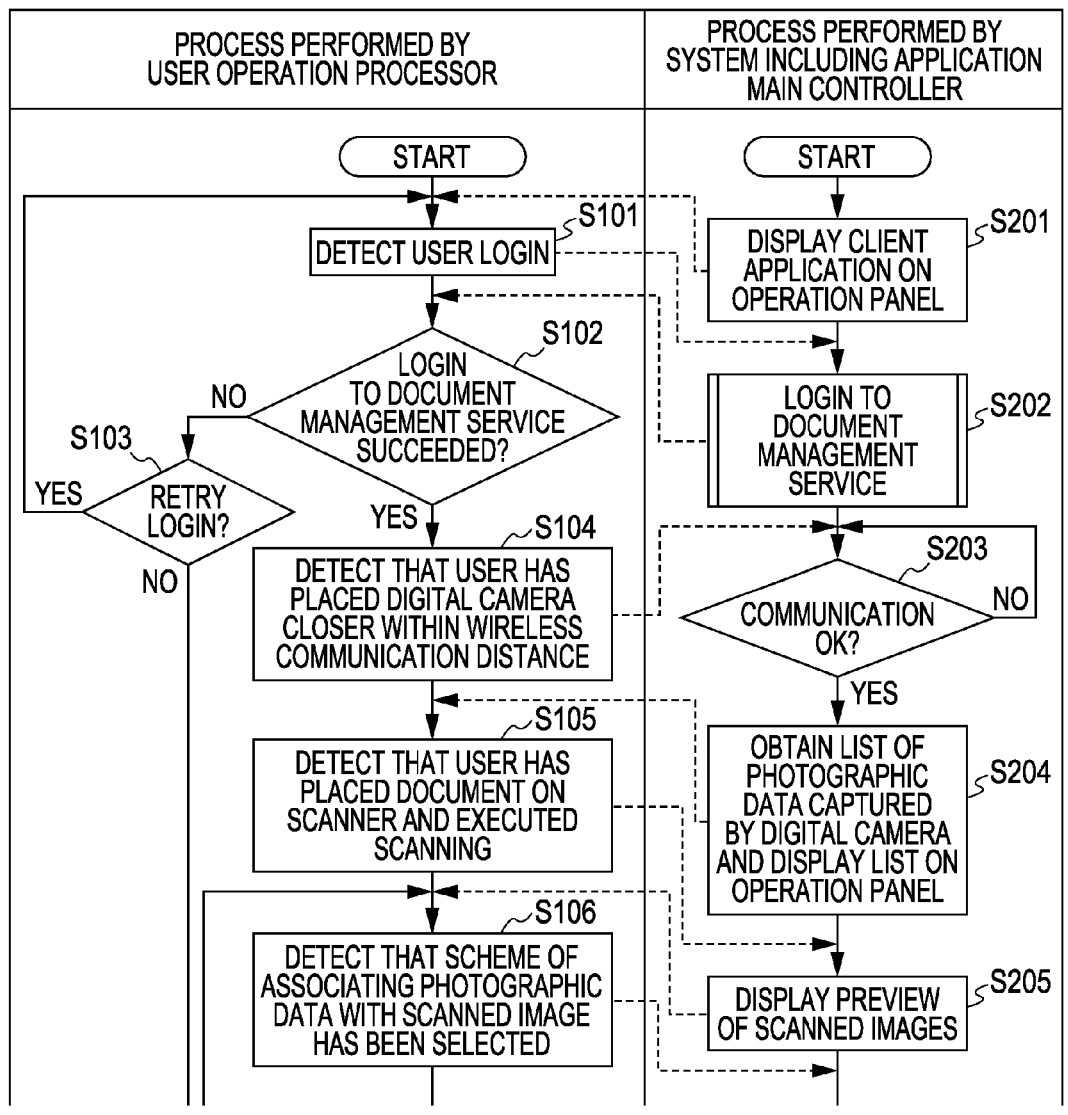
FIGS. 9A and 9B constitute a flowchart of a process performed in the system of the embodiment.
Figure 9B:
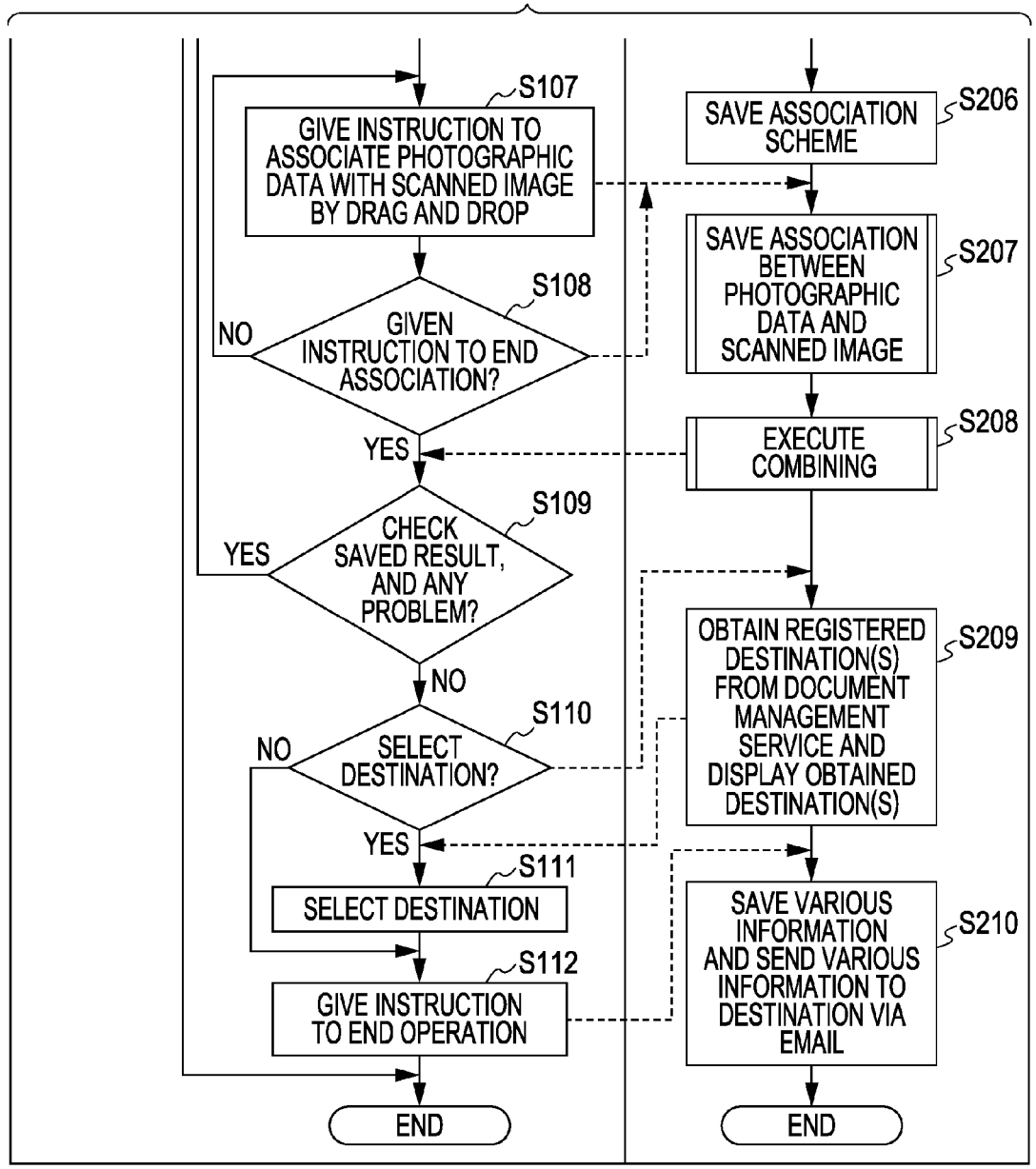

FIGS. 9A and 9B constitute a flowchart of a process performed in the system of the embodiment. More specifically, FIGS. 9A and 9B show the flow in the data combining/registration system according to the embodiment.

A user selects photographic data captured by the digital camera 30 via a user interface displayed on the display 102 of the MFP 10. A scanned image obtained by scanning a document using the scanner 104 is processed by the client application included in the MFP device 10. The processed data is sent to the document management service device 20. The flow of the process is shown in FIGS. 9A and 9B.

In step S201, the client application of the system is loaded into the memory 105 and executed. Accordingly, an application main controller 1001 displays a user interface of the client application on the display 102 of the MFP device 10 via the GUI display unit 1002.

In step S101, a user operation processor 1003 accepts login information entered by the user A using the user interface displayed in step S201. In step S202, the system executes a login process of logging in to the document management service device 20 (the flow of the login process of logging in to the document management service device 20 in step S202 will be described in more detail later). In step S101, alternatively, the login information may be entered by the user A using a medium, such as an integrated circuit (IC) card, with which the bearer can be identified.

In the case that the user operation processor 1003 determines in step S102 that the user A has failed to log in to the document management service device 20 in step S101, the user operation processor 1003 determines in step S103 whether to retry login to the document management service device 20. In the case of no login retry, the system ends the process. In the case that the user operation processor 1003 decides retry to log in to the document management service device 20 in step S103, the flow returns to step S101. The user A reenters the login information, and the user operation processor 1003 executes the flow from step S101 onward.

In step S203, the application main controller 1001 displays a user interface awaiting photographic data or a scanned image to be input on the display 102 of the MFP device 10 via the GUI display unit 1002. Furthermore, the application main controller 1001 waits until the digital camera 30 approaches the MFP device 10 so that the MFP device 10 can communicate with the digital camera 30 via a wireless-communication controller 1004.

In step S104, the user operation processor 1003 detects that the user A has moved the digital camera 30 close enough to the wireless-communication unit 103 of the MFP device 10. In step S203, the application main controller 1001 of the system, which has been on standby, receives an event indicating that the MFP device 10 can communicate with the digital camera 30 from the wireless-communication controller 1004. Thereafter in step S204, the application main controller 1001 obtains photographic data saved in the digital camera 30 using the wireless-communication controller 1004. The application main controller 1001 temporarily saves the data in the large-capacity storage unit 106 of the MFP device 10 via a data storage unit 1006. Then, the application main controller 1001 generates reduced image data via a display data generator 1008 on the basis of the photographic data, which has been obtained from the digital camera 30 and saved in the large-capacity storage unit 106. The application main controller 1001 displays a list of pieces of photographic data on the display 102 (operation panel) of the MFP device 10 via the GUI display unit 1002. In this case, the generated reduced image data may be temporarily saved in the large-capacity storage unit 106 via the data storage unit 1006 or may be expanded in the memory 105.

Figure 5:
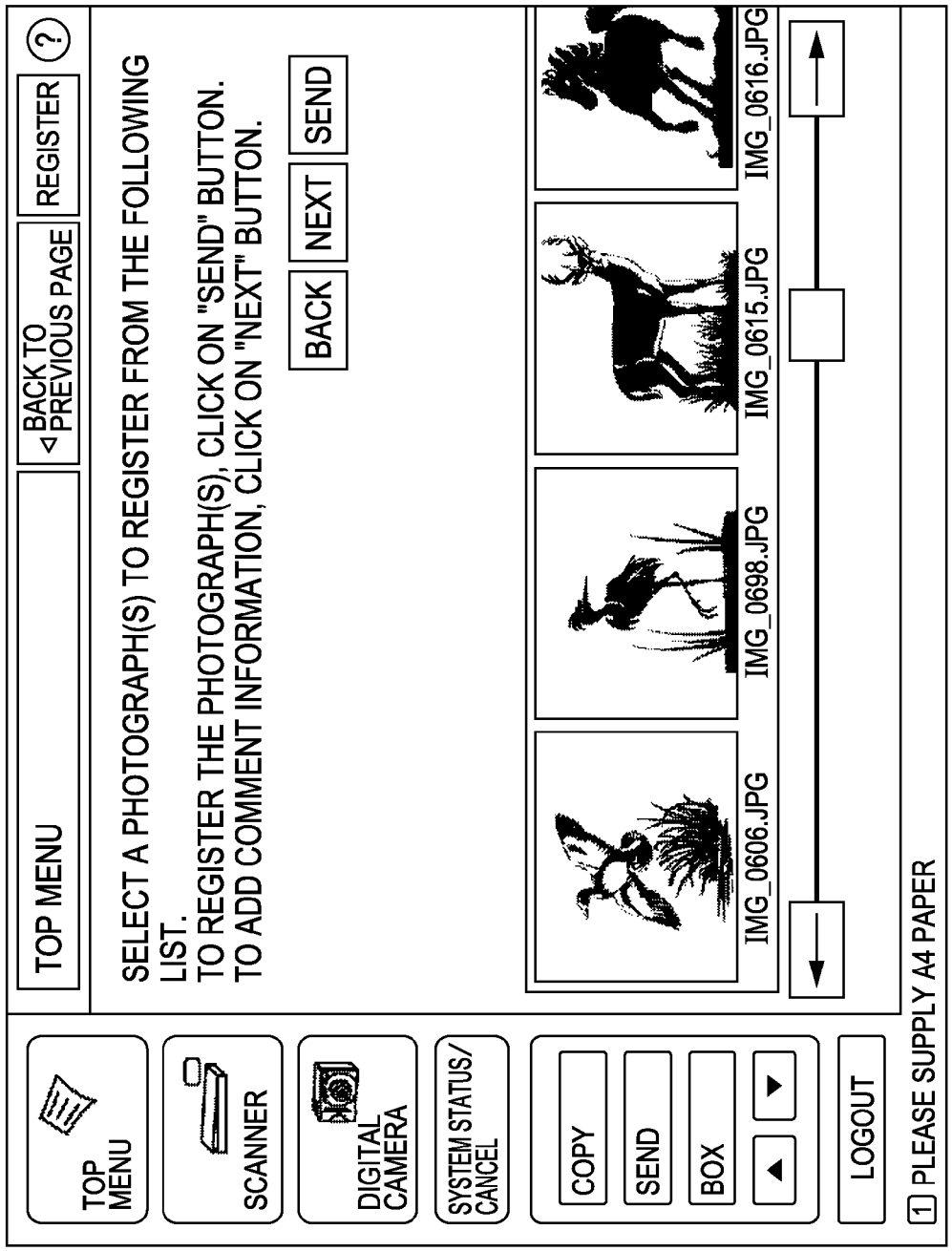
FIG. 5 illustrates an exemplary user interface on which a list of pieces of data is displayed by a client application in the system of the embodiment.

FIG. 5 illustrates an exemplary user interface displaying a list of pieces of photographic data displayed on the display 102. From the list of photographic data displayed on the display 102, the user A selects a photograph(s) to save, and the flow proceeds to the next step. If the user A need not perform special setting, the user A may select all the pieces of data obtained from the digital camera 30 or select a desired photograph(s) to save from the list of photographic data displayed on the display 102, and may send the selected data to the document management service device 20. Note that the user interface shown in FIG. 5 is only an example, and any user interface and any control for implementing the functions needed here may be employed.

Referring back to FIG. 9A, in step S105, the user operation processor 1003 detects that the user A has set a desired document to be saved in the document management service device 20, together with the photographic data obtained from the digital camera 30, on the scanner 104 of the MFP device 10. In this case, the document contains detailed descriptions and reports of the photographic data. The scanner 104 executes the scanning of the document. Note that the paper size and format of the document are not particularly limited, and, for example, scratch paper or writing paper may be scanned. In other words, any type of paper medium may be scanned as long as the paper medium can be scanned by the scanner 104 of the MFP device 10. Although the operation in which scanned images obtained by scanning a document are used is described in the embodiment of the present invention, electronic data saved in the large-capacity storage unit 106 of the MFP device 10 or electronic data obtained from a portable storage medium, such as a USB memory, may be used.

In step S205, the application main controller 1001 of the client application of the system scans the document set on the scanner 104 of the MFP device 10 via a scanner controller 1005. The scanned images are obtained and temporarily saved in the large-capacity storage unit 106 of the MFP device 10 via the data storage unit 1006. Thereafter, the application main controller 1001 generates reduced scanned images by reducing, via the display data generator 1008, the scanned images saved in the large-capacity storage unit 106. The application main controller 1001 displays a list of the scanned images on the display 102 of the MFP device 10 via the GUI display unit 1002. In this case, the generated reduced image data may be temporarily saved in the large-capacity storage unit 106 via the data storage unit 1006 or may be expanded in the memory 105.

Figure 6:
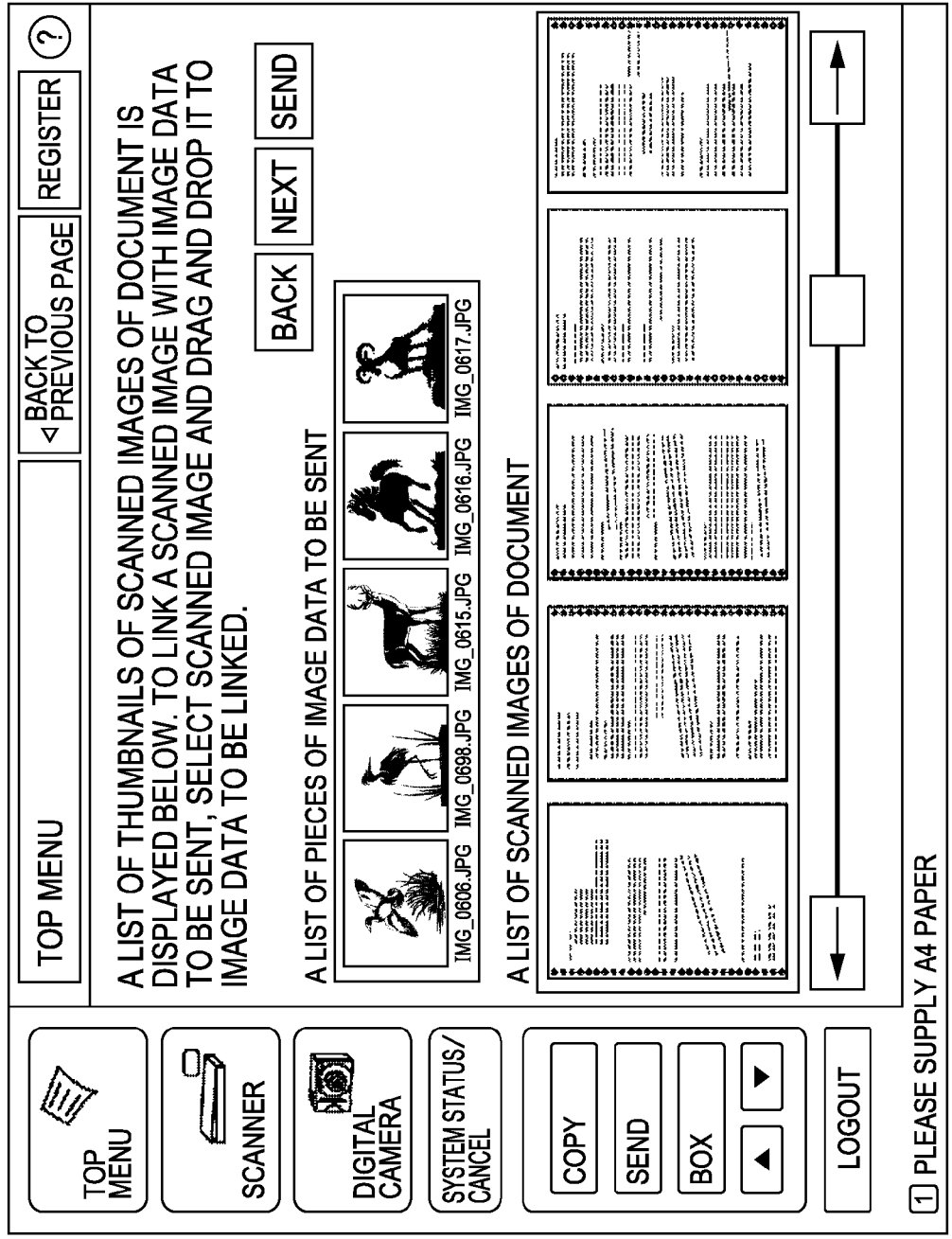
FIG. 6 illustrates an exemplary user interface on which a list of scanned images is displayed by the client application in the system of the embodiment.

FIG. 6 illustrates an exemplary user interface showing a list of scanned images displayed on the display 102. Note that the user interface shown in FIG. 6 is only an example, and any user interface and any control for implementing the functions needed here may be employed.

Next, the user A selects the scheme of generating combined data when associating photographic data obtained from the digital camera 30 with a scanned image obtained using the scanner 104 and saving the associated data and the image. This selection is detected in step S106 by the user operation processor 1003. This selection is performed via the user interface screen displayed on the display 102 of the MFP device 10. In the embodiment of the present invention, the scheme in which the photographic data and the scanned image are combined and displayed in HTML format is described. Alternatively, the photographic data may be placed on the scanned image to generate one image file to be saved. Alternatively, the photographic data may be associated with the scanned image, and, the photographic data and the scanned image may be, without being combined with each other, saved separately in the document management service device 20.

In step S206, the application main controller 1001 obtains the association scheme selected by the user A in step S106 via the user operation processor 1003. The application main controller 1001 further saves the selected scheme in the memory 105 or the large-capacity storage unit 106 of the MFP device 10.

Figure 7:
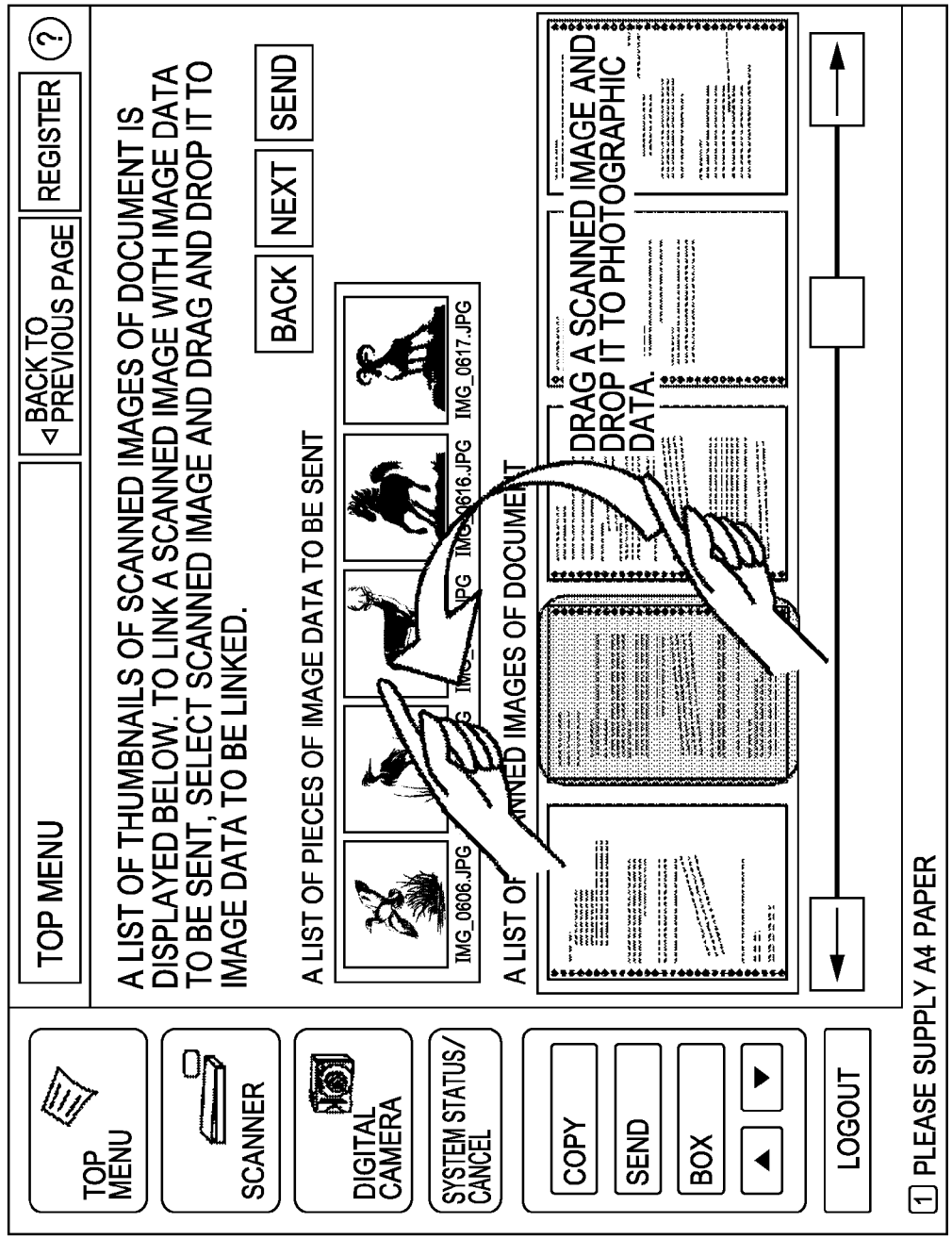
FIG. 7 illustrates an exemplary user operation for associating photographic data with a scanned image using the client application in the system of the embodiment.

Next, as in an example shown in FIG. 7, the user A gives an instruction to associate the photographic data with the scanned image by using drag and drop via the user interface displayed on the display 102 of the MFP device 10. This association instruction is detected in step S107 by the user operation processor 1003. In this case, the association instruction may be given by any other means besides drag and drop. The association between photographic data and scanned images is not limited to one to one, and may be plural to plural. In the association process, instead of dragging the scanned image, the photographic data may be dragged and dropped to the scanned image.

In step S207, the system saves the association between the photographic data and the scanned image, which has been specified in step S107 (the flow of saving the association between the photographic data and the scanned image in step S207 will be described in detail later).

Next, the user A gives an instruction to end the process of associating the photographic data with the scanned image, which is shown as the example in FIG. 7. In step S108, the end instruction is detected by the user operation processor 1003. In response to this, the system ends the process of saving the association between the photographic data and the scanned image in step S207. Thereafter, in step S208, the document management service device 20 executes a process of combining the photographic data with the scanned image (the flow of combining the photographic data with the scanned image in step S208 will be described in detail later).

A screen for checking the result of combining the photographic data with the scanned image in step S208 is displayed in step S109 by the user operation processor 1003. The user A checks the displayed screen. In this case, the user A may check the combined result via a browser (not shown) displayed on the display 102 of the MFP device 10. Any checking scheme that corresponds to the specified scheme of associating the photographic data with the scanned image, which has been detected in step S106, may be used.

In the case that, in step S109, the user operation processor 1003 receives an instruction to perform the combining process again, the flow returns to step S106. The user operation processor 1003 restarts the process of selecting the scheme of associating the photographic data with the scanned image. In this case, the user operation processor 1003 may only reselect the association scheme and may skip step S107 and step S108 in which the instruction to associate the photographic data with the scanned image is affirmed.

In step S110, the user operation processor 1003 detects whether the user A selects to inform anyone of the result of combining the photographic data with the scanned image, which has been checked and confirmed in step S109. For example, the user A uses a user interface shown in FIG. 8. In the case that the user A wants to inform someone of the result, the application main controller 1001 of the client application of the system gives an instruction to a user information obtaining unit 1010. The application main controller 1001 asks the document management service device 20 for the presence of any destination that has already been registered in association with the user A via the network interface 107 of the MFP device 10. The document management service device 20 is informed that a service main controller 2001 has received the request for obtaining a registered destination via a data sending/receiving unit 2002. In response to this, the document management service device 20 searches for destination information registered in association with the user A via a user information storage unit 2003. The document management service device 20 sends back the search result. The application main controller 1001 of the client application receives the result and displays a user interface screen on the display 102 of the MFP device 10 via the GUI display unit 1002.

Figure 8:
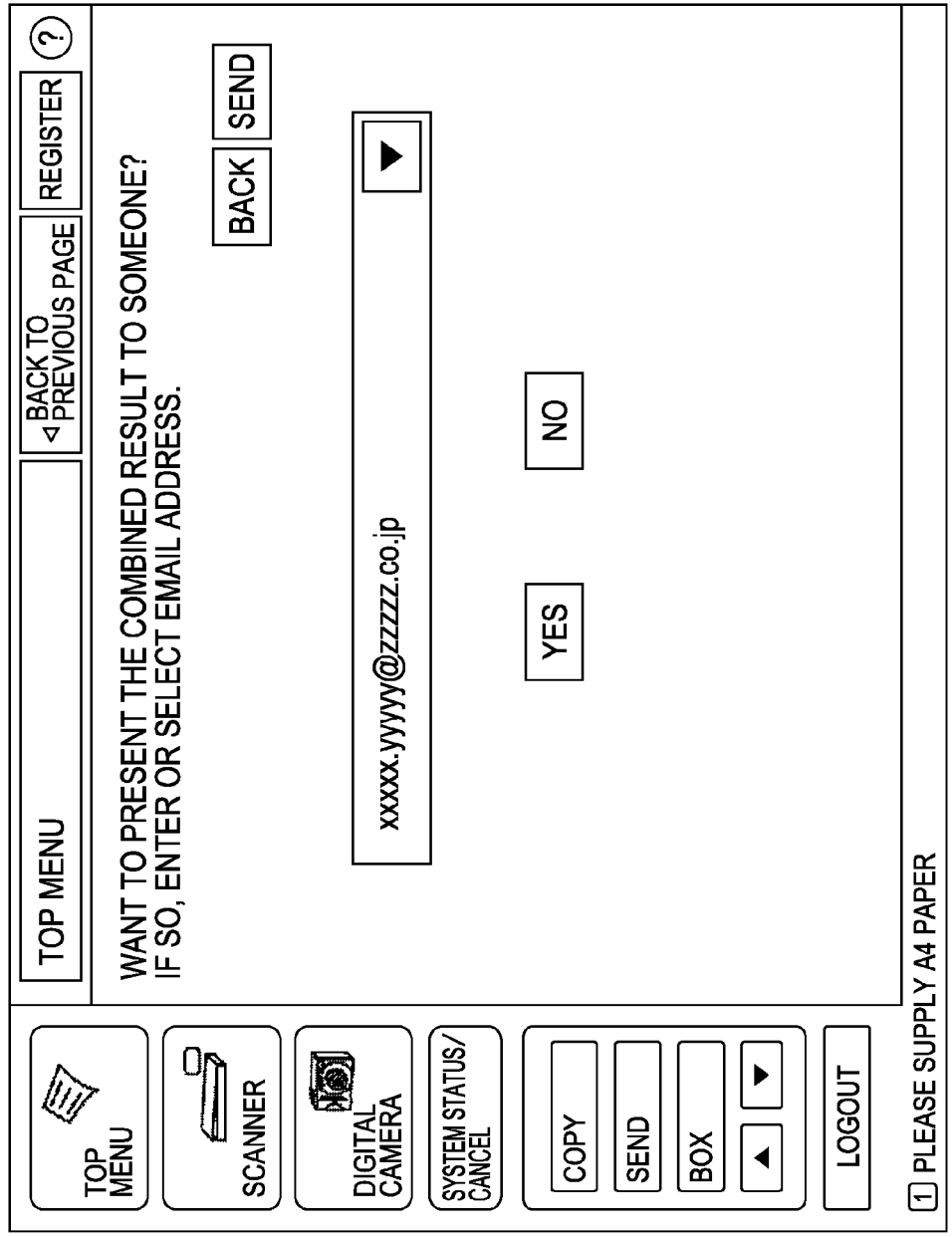
FIG. 8 illustrates an exemplary user interface displayed by the client application in the system of the embodiment to allow a user to select an email destination.

FIG. 8 is an exemplary user interface for allowing the user A to select a destination, which is displayed on the display 102. The user interface shown in FIG. 8 is only an example. A plurality of users can be selected as destinations by performing a list control. Any user interface and any control for implementing the functions needed here may be employed.

In step S111, a user interface program detects via the user interface displayed on the display 102 that the user A has selected the destination. The display 102 is shown as an example in FIG. 8 to describe step S110 and is included in the MFP device 10. In the embodiment of the present invention, the user A selects the user B as the destination. This selection is detected by the user operation processor 1003. As has been described above, multiple users may be selected as destinations.

Finally in step S112, the user operation processor 1003 detects that the user A has given an instruction to end the operation using the system. In response to this, in step S210, the application main controller 1001 obtains various pieces of information set by the user A in the above steps from a user-specified-information saving unit 1007. A data sending/receiving unit 1009 is instructed to send a request to save the information set by the user A to the document management service device 20 via the network interface 107 of the MFP device 10. The information set by the user A includes the scheme of associating the photographic data with the scanned image and the destination information. Besides these pieces of information, the information set by the user A may include other pieces of information. Thereafter, in the case that the service main controller 2001 of the document management service device 20 receives the request to save the information set by the user A via the data sending/receiving unit 2002, the document management service device 20 saves the information in the user information storage unit 2003. Accordingly, the next time the user A uses the system, the customized information in accordance with the previously set details can be used.

Furthermore, in accordance with the destination specified in step S111 (the user B in the case of the embodiment of the present invention), the application main controller 1001 sends an email message to the user B via an email sender 1011. Preferably, the email content includes a uniform resource locator (URL) that indicates the location in the document management service device 20 where the result of combining the photographic data with the scanned image in step S208 has been saved. The email message may include a shortcut to activate a browser including information indicating the saving location of the combined result. Thereafter, the application main controller 1001 gives an instruction to the data sending/receiving unit 1009. The application main controller 1001 sends a logout request to the document management service device 20 via the network interface 107 of the MFP device 10. The document management service device 20 receives the request and performs the post-processing. The process performed in the system according to the embodiment of the present invention ends.

The processing performed in some of the steps in the system by the client application of the system, which has been installed in the MFP device 10, and the document management service device 20 will be described in specific details using the drawings.

Login to Document Management Service

Figure 10:
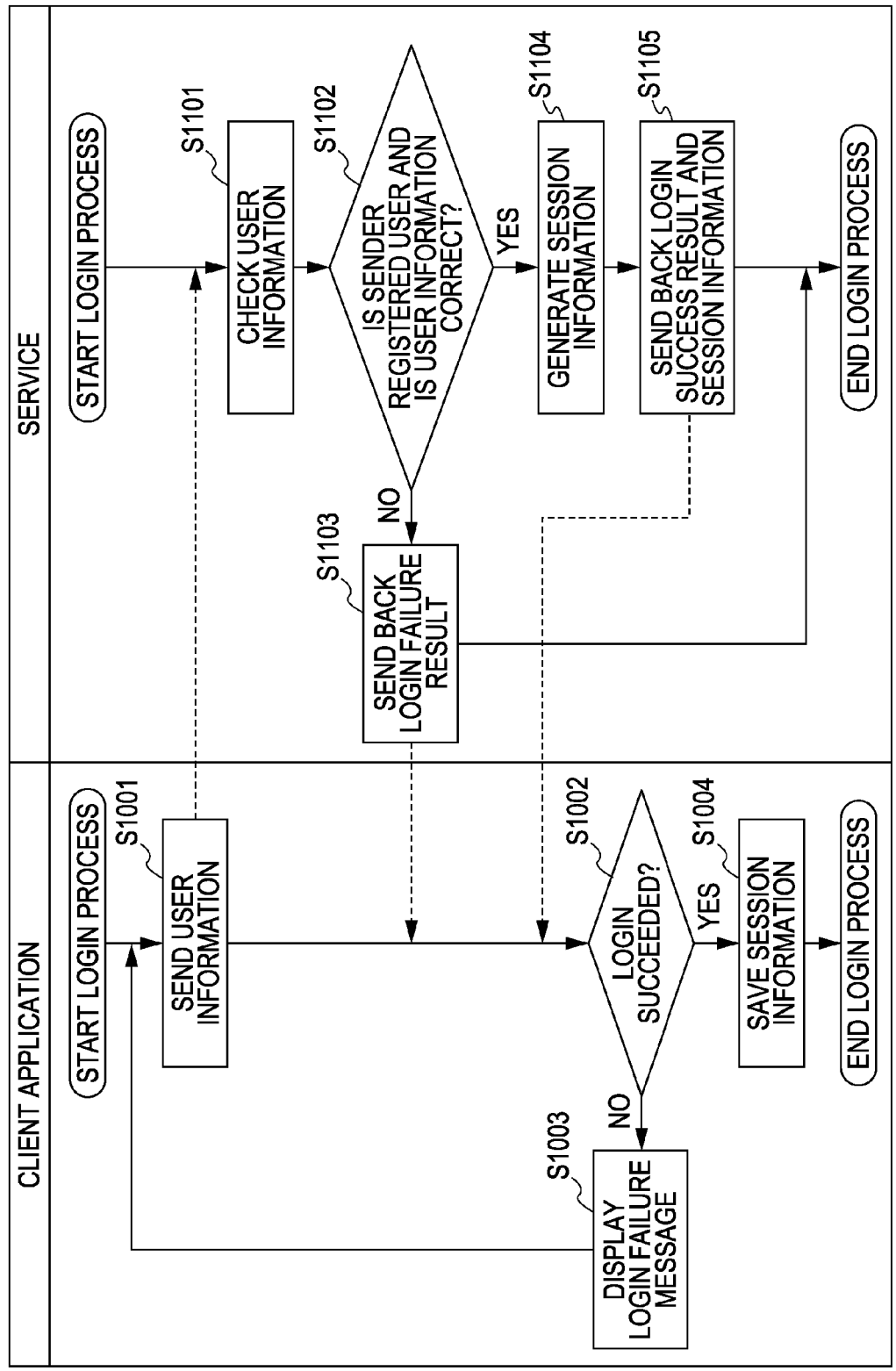
FIG. 10 is a flowchart of a login process performed by the client application and the document management service in the system of the embodiment.

In step S202, a login process of logging in to the document management service device 20 is executed using login information entered via a user interface. The user interface is part of the client application of the system, which is displayed on the display 102 of the MFP device 10. FIG. 10 is a flowchart of a process performed by the client application and the document management service device 20 involved in the MFP device 10 logging in to the document management service device 20. A detailed description will be given now using FIG. 10.

In step S1001, the application main controller 1001 of the client application of the system obtains the user information entered by the user A in step S101 from the user-specified-information saving unit 1007. The application main controller 1001 gives an instruction to the data sending/receiving unit 1009. The application main controller 1001 sends a login request to the document management service device 20 via the network interface 107 of the MFP device 10.

In step S1001, the client application sends the login request to the document management service device 20. In step S1101, the data sending/receiving unit 2002 receives the request and informs the service main controller 2001 of an event that the request has been received. The user information included in the login request is saved in a request storage unit 2004, and then the user information storage unit 2003 is asked and checked whether the sender of the request is a registered user.

In step S1102, the document management service device 20 checks whether the sender of the request is determined in step S1101 as a registered sender and whether the user information is correct. When the result shows that the user information is incorrect, the flow proceeds to step S1103. In step S1103, the service main controller 2001 instructs the data sending/receiving unit 2002 to send back a login failure result. The service main controller 2001 discards the user information saved in the request storage unit 2004.

In the case that the user information is determined to be correct in step S1102, in step S1104, the service main controller 2001 generates session information. The service main controller 2001 associates the session information with the user information saved in the request storage unit 2004 and saves the associated pieces of information. In the post-processing performed in step S210 by the document management service device 20, the service main controller 2001 deletes the user information and the session information saved in the request storage unit 2004. In the case that a sequence of exchanging requests between a server and a client is executed, user information is not added to all the requests. The session information indicates a unique identification (ID) that explicitly shows the processing sequence from login to logout. For example, the document management service device 20 may use a known technique, such as Cookie in HTTP, as the session information.

In step S1105, the service main controller 2001 of the document management service device 20 instructs the data sending/receiving unit 2002 to send back a login success result and the session information generated in step S1104.

In step S1002, the application main controller 1001 of the client application receives an event that information in response to the login request has been received via the data sending/receiving unit 1009. In the case that the login process of logging in to the document management service device 20 failed, the application main controller 1001 displays in step S1103 a message indicating that the login failed on the display 102 of the MFP device 10 via the GUI display unit 1002.

When it is determined in step S1002 that the login to the document management service device 20 succeeded, the application main controller 1001 performs the next processing in step S1004. More specifically, the application main controller 1001 saves the session information sent from the document management service device 20 in the data storage unit 1006. The client application adds the session information to all the requests made in the processing sequence until the user A logs out, which is performed by the client application and the document management service device 20, and sends the information.

Saving Association between Photographic Data and Scanned Image

Figure 11:
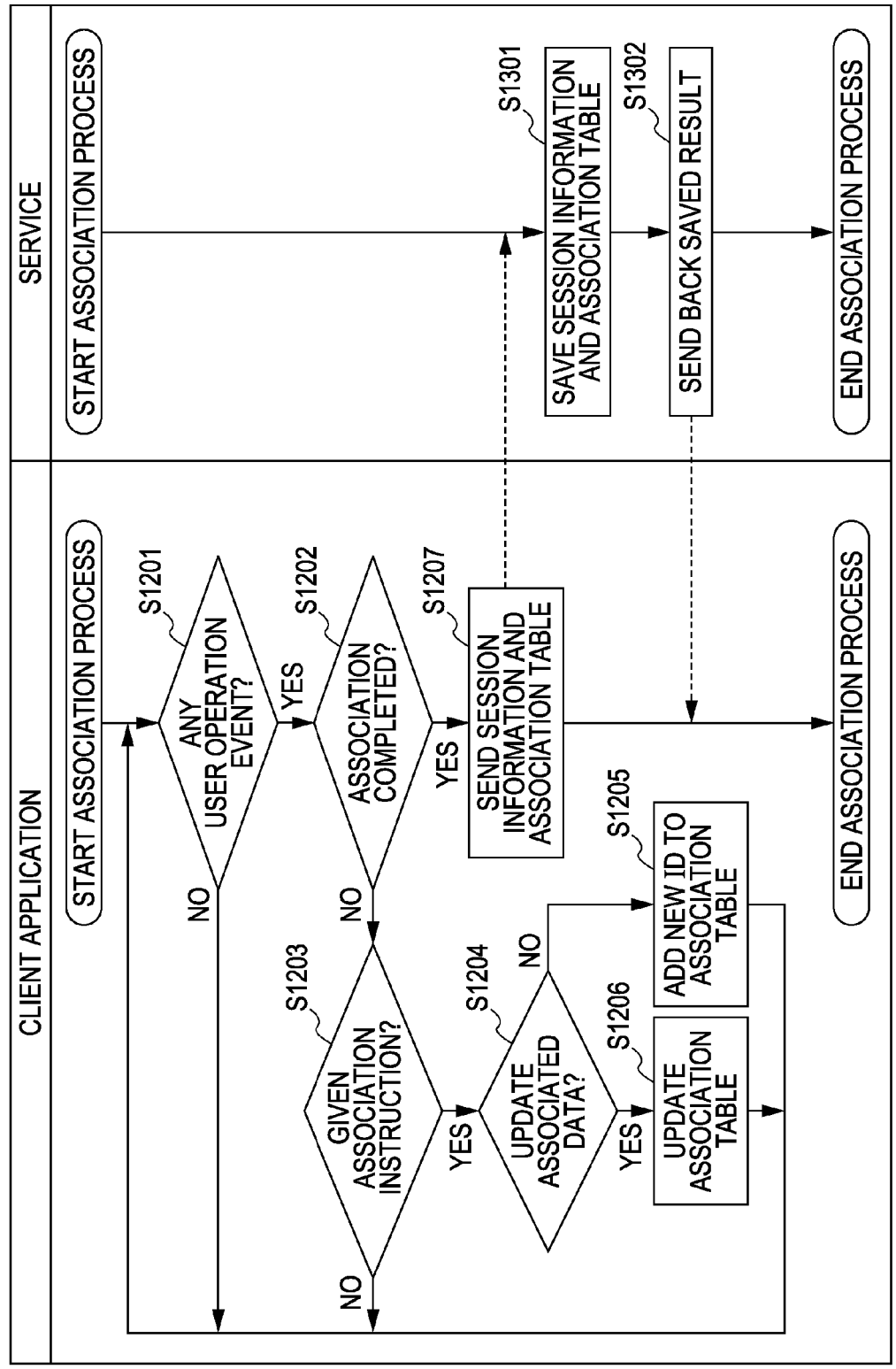
FIG. 11 is a flowchart of a process performed by the client application and the document management service involved in a user operation for associating photographic data with a scanned image in the system of the embodiment.

In step S207, the document management service device 20 performs a process of saving the association between the photographic data and the scanned image specified by the user A in step S107 via the user interface displayed on the display 102 of the MFP device 10. More specifically, the client application of the system and the document management service device 20 perform a process of saving the association. FIG. 11 is a flowchart of the process performed by the client application and the document management service device 20 for saving the association. A detailed description will now be given below using FIG. 11.

In response to establishment of communication between the MFP device 10 and the digital camera 30 in step S203, step S1201 starts.

In step S1201, the application main controller 1001 of the client application monitors the user operation processor 1003. This enables the application main controller 1001 to detect any operation performed by the user A via the user interface displayed on the display 102 of the MFP device 10.

In the case that any operation performed by the user A is detected in step S1201, the application main controller 1001 checks in step S1202 whether the user A has completed the process of associating the photographic data with the scanned image.

In the case that it is determined in step S1202 that the operation performed by the user A is not to complete the association process, the application main controller 1001 checks in step S1203 whether the operation is to give an instruction to associate photographic data with a scanned image.

In the case that it is determined in step S1203 that the operation performed by the user A is to give an association instruction, in step S1204, the application main controller 1001 gives a query to the user-specified-information saving unit 1007. Accordingly, the application main controller 1001 checks whether the instruction is for photographic data whose association information has already been saved. The document management service device 20 manages the photographic data and scanned images saved in the data storage unit 1006 by assigning unique IDs to the photographic data and scanned images so as to be distinguishable from one another. Furthermore, the document management service device 20 manages the association information between the photographic data and scanned images in the user-specified-information saving unit 1007.

In the case that it is determined in step S1204 that the user-specified-information saving unit 1007 contains no association information regarding the ID specifying the photographic data desired by the user A to be associated, the application main controller 1001 performs the next processing in step S1205. The application main controller 1001 adds a new ID specifying the photographic data to an association information table. Furthermore, the application main controller 1001 saves this new ID, together with the ID specifying the scanned image to be associated with the desired photographic data, in the large-capacity storage unit 106 of the MFP device 10 via the user-specified-information saving unit 1007.

In the case that it is determined in step S1204 that the user-specified-information saving unit 1007 contains association information regarding the ID specifying the photographic data desired by the user to be associated, the application main controller 1001 performs the next processing in step S1206. The application main controller 1001 updates the contents of the association information table in accordance with an operation performed by the user A, such as addition, change, or deletion of a scanned image(s) to be associated with the photographic data. The application main controller 1001 saves the association information table in the large-capacity storage unit 106 of the MFP device 10 via the user-specified-information saving unit 1007.

In the case that it is determined in step S1202 that the operation performed by the user A is to end the association process, the application main controller 1001 performs the next processing in step S1207. The application main controller 1001 obtains the association information table regarding the photographic data and the scanned image via the user-specified-information saving unit 1007. Furthermore, the application main controller 1001 sends the session information saved in the data storage unit 1006, which has been sent by the document management service device 20 as the login result. In addition, the application main controller 1001 instructs the data sending/receiving unit 1009 to send the association information table to the document management service device 20 via the network interface 107 of the MFP device 10.

In the case that the session information and the association information table are sent from the client application in step S1207, the data sending/receiving unit 2002 of the document management service device 20 receives a request in step S1301. The service main controller 2001 is informed of an event that the request has been received, and the association information table is saved in association with the session information in the request storage unit 2004.

In step S1302, the service main controller 2001 of the document management service device 20 sends back the result of saving the association information table in association with the session information in step S1301 to the client application.

The client application displays the association result on the display 102 of the MFP device 10.

Execution of Combining Process

In step S208, the client application of the system and the document management service device 20 execute a process of combining the photographic data with the scanned image. The combining process is in association with the association between the photographic data and the scanned image, which has been specified in step S107 by the user A via the user interface of the client application displayed on the display 102 of the MFP device 10.

FIG. 12 is a flowchart of a process performed by the client application and the document management service device 20 for combining the photographic data with the scanned image. A detailed description will now be given below using FIG. 12. After communication has been established between the digital camera 30 and the MFP device 10, the process shown in FIG. 12 starts in response to a combining process starting request given from the display 102 of the MFP device 10.

In step S1401, the application main controller 1001 obtains pieces of photographic data, which have been saved in step S207 in the large-capacity storage unit 106 of the MFP device 10. Similarly, the application main controller 1001 obtains, via the user-specified-information saving unit 1007, IDs indicating the pieces of photographic data, which are saved in the association information table regarding scanned images saved in the large-capacity storage unit 106. Thereafter, the application main controller 1001 sequentially obtains the pieces of photographic data associated with the IDs saved in the association information table from the large-capacity storage unit 106 via the data storage unit 1006. The application main controller 1001 instructs the data sending/receiving unit 1009 to send the obtained information via the network interface 107 of the MFP device 10. The data sending/receiving unit 1009 sends the IDs indicating the photographic data and the session information saved in the data storage unit 1006, which has been sent by the document management service device 20 as the login result, to the document management service device 20.

In step S1501, the service main controller 2001 of the document management service device 20 associates the pieces of photographic data and the IDs indicating the pieces of photographic data, which are sequentially sent from the client application in step S1401, with the session information and saves the associated information in the hard disk 15 via a data storage unit 2005.

In step S1502, the service main controller 2001 of the document management service device 20 sends back the result of saving the photographic data in step S1501 to the client application via the data sending/receiving unit 2002.

In step S1402, the application main controller 1001 obtains the IDs via the user-specified-information saving unit 1007. The IDs indicate the scanned images associated with the photographic data saved in the association information table regarding the photographic data and scanned images, which has been saved in the large-capacity storage unit 106 of the MFP device 10 in step S207. The application main controller 1001 sequentially obtains the scanned images corresponding to the IDs saved in the association information table from the large-capacity storage unit 106 via the data storage unit 1006. The IDs indicating the scanned images and the session information saved in the data storage unit 1006, which has been sent by the document management service device 20 as the login result, are sent to the document management service device 20. The data sending/receiving unit 1009 is instructed to send the information via the network interface 107 of the MFP device 10.

In step S1503, the service main controller 2001 saves the scanned images sent from the client application in step S1402 in the hard disk 15 via the data storage unit 2005. Furthermore, the service main controller 2001 saves the IDs indicating the scanned images in association with the session information in the hard disk 15 via the data storage unit 2005.

In step S1504, the service main controller 2001 of the document management service device 20 sends back the result of saving the scanned images in step S1503 to the client application via the data sending/receiving unit 2002.

In step S1505, the document management service device 20 generates thumbnails (reduced data) of the photographic data obtained by the service main controller 2001 via the data storage unit 2005. The document management service device 20 saves the generated thumbnails in the data storage unit 2005. In this case, the document management service device 20 serially performs the processing relative to the processing in steps S1501 and S1502. Alternatively, after saving the photographic data in step S1501, the document management service device 20 may generate thumbnails of the photographic data in parallel to the next step S1502.

In step S1506, the service main controller 2001 obtains, via a template storage unit 2009, an HTML template serving as a format for generating the result of combining each piece of the photographic data with an associated scanned image(s). The service main controller 2001 adds a file path of each thumbnail of the photographic data saved in the data storage unit 2005, which has been generated in step S1505, via an HTML generator 2007. FIG. 13 illustrates exemplary HTML samples generated as the result of combining photographic data with a scanned image in the data combining/registration system according to the embodiment of the present invention. An HTML sample 1300 defines frames. An HTML sample 1301 defines a photographic data list area. In the HTML samples 1300 and 1301, portions other than additions constitute an exemplary HTML template obtained via the template storage unit 2009. For example, a portion 1302 corresponds to addition of a file path of the thumbnail of the photographic data, which has been added to the HTML template obtained in step S1506 via the HTML generator 2007. More specifically, the portion 1302 corresponds to "addition 1 of the thumbnail of the photographic data" to the HTML sample 1301. Regarding the HTML samples 1300 and 1301 generated as a result of combining the photographic data with the scanned images, which are shown in FIG. 13, the HTML format and description method are not limited.

Alternatively, the following may be possible. For example, the digital camera 30 and the MFP device 10 are brought close enough to each other. This establishes communication between the digital camera 30 and the MFP device 10. Image data stored in the recording unit 1504 or the recording medium 1510 of the digital camera 30 is read. The camera communication interface 1509 sends the image data. The image data is sent via the network interface 107 to the MFP device 10. The network interface 107 is connected to the wireless-communication unit 103. The network interface 107 may be a wireless-communication medium or USB.

The image data is received via the wireless-communication unit 103 and stored in the large-capacity storage unit 106. The MFP device 10 having the images stored therein starts the processing in step S1401. The processing is the same from this point onward.

Alternatively, steps S1501 to S1509 may be performed inside the MFP device 10. In this case, the client application in the MFP device 10 and the service application perform the process shown in FIG. 12 in the MFP device 10. The combined result, which is exemplary display data, may be sent to another computer.

FIG. 14 shows an exemplary user interface displaying an HTML document generated as a result of combining the photographic data with the scanned images in the data combining/registration system on a browser. In step S1506, a portion of the HTML document corresponding to an area specified as the photographic data list shown in FIG. 13 is edited. Regarding the user interface displaying the HTML document on the browser, which has been shown in FIG. 13 as an example of the result of combining the photographic data with the scanned images, the form, frame structure, and control are not limited. In other words, the user interface may take any form as long as an HTML document is generated for implementing the necessary features.

In step S1507, the service main controller 2001 performs the next processing on the HTML document to which the file path of each thumbnail of the photographic data has been added in step S1506. More specifically, the service main controller 2001 adds a process corresponding to a portion 1303 as a script to the HTML document. An exemplary script corresponds to the portion 1303 added to the HTML sample 1301 shown in FIG. 13. An exemplary result of the operation involved in the script is as follows. For example, in the case that a thumbnail of the photographic data in the photographic data list shown in FIG. 13 is clicked, the associated photographic data is displayed in an area specified as an enlarged display area for displaying the photographic data, which is a separate frame. Furthermore, a script specifying a scanned image associated with the photographic data to be displayed in an area specified as an enlarged display area for displaying the scanned image associated with the photographic data may also be inserted into the HTML sample 1301. In order to implement these processes, not only a simple HTML, but also techniques such as a dynamic HTML (DHTML) or Ajax may be used to perform asynchronous processes in the case that the thumbnail of the photographic data is clicked. Furthermore, a rendering correction may be made, such as specifying enlargement or reduction of the displayed photographic data or the scanned image in the frame. Although the case in which the processes are executed using scripts has been described, the result of combining the photographic data with the scanned image may be shown by simply jumping to a different page using a hyperlink.

In step S1508, the service main controller 2001 saves the HTML document, which has been generated in steps S1506 and S1507, in a storage device (not shown) via the user information storage unit 2003. Furthermore, the service main controller 2001 generates a URL character string indicating the saved HTML document and saves the URL character string in association with the session information in the user information storage unit 2003. Accordingly, the user checking the combined result need not install a special application for browsing the result in a client PC (not shown). The user is enabled to check the result via pre-installed standard browsers. Since the combined results are saved in the user information storage unit 2003, the user can check a list of the combined results saved by the user. Only a partner to whom the user wants to present the combined results may be set to gain access to the user information storage unit 2003.

In step S1403, the client application gives a query request to the document management service device 20 asking whether the process of combining the photographic data with the scanned images has been completed. In this case, the session information is added to the request.

In step S1509, the document management service device 20 gives a response to the request made in step S1403 by the client application, indicating whether the process up to step S1508 has been completed on the basis of the session information added to the request. In this case, if the process has been completed, the service main controller 2001 obtains the URL character string saved in step S1508 in the user information storage unit 2003 and sends back the URL character string, together with the result of the process, to the client application.

In the case that the client application determines in step S1404 that the combining process has not been completed on the basis of the result of the process, which has been sent from the document management service device 20 in step S1509, the client application performs the next processing. More specifically, the flow returns to step S1403, and the client application periodically asks the document management service device 20 whether the process has been completed. In this case, the completion of the combining process may be checked not only by the query from the client application to the document management service device 20.

Alternatively, the completion of the combining process may be checked by allowing the document management service device 20 to inform the client application of the result of the process.

In the case that it is determined in step S1404 that the combining process has been completed by the document management service device 20, the application main controller 1001 performs the next processing. The application main controller 1001 temporarily saves the URL indicating the combined result, which has been sent from the document management service device 20 in step S1509, in the memory 105 or the large-capacity storage unit 106 via the data storage unit 1006.

In step S1405, the client application performs the next processing. The client application activates a browser (not shown) installed in the MFP device 10 and sends a request to obtain the HTML document indicated by the URL at which the combined result sent from the document management service device 20 in step S1509 has been saved.

In step S1510, the document management service device 20 performs the next processing. The service main controller 2001 of the document management service device 20 obtains the HTML document from the user information storage unit 2003 in accordance with the URL indicated in step S1405 by the client application and sends back the HTML document to the client application (browser).

In step S1406, the HTML document sent in step S1510 from the document management service device 20 is displayed via the browser on the display 102 of the MFP device 10.

Although the combined result may be checked via the browser in the embodiment of the present invention, the checking method is not limited thereto. For example, the combined result may be shaped as an image, and the image may be displayed.

FIG. 16 illustrates exemplary combined data according to the embodiment of the present invention. Through the combining process, combined data serving as exemplary display data is generated. A forming process includes a generating process. The forming process includes selecting a document set of an image, document data, and an HTML template. A description will be given with reference to FIGS. 14 and 16. FIG. 16 includes inserted portions 1601 to 1603 and inserted portions 1604 to 1606. The portion 1601 corresponds to the portion 1604. The portion 1602 corresponds to the portion 1605. The portion 1603 corresponds to the portion 1606. A set of the portions 1601 and 1604 will be described by way of example. The portion 1604 corresponds to a thumbnail 1401 shown in FIG. 14. In the portion 1604, a portion sandwiched between TD tags is the character string "Page 1", which is displayed as "Page 1" below the thumbnail 1401. The thumbnail 1401 corresponds to a file named "XXX.JPG", which is an image captured by the digital camera 30. In the case that the thumbnail 1401 is specified using a user interface such as a mouse, an update 1( ) function is called. When the update 1( ) function is called, the browser reads "Picture1.html" defined in the portion 1601, which in turn is updated and displayed in a "Picture" frame 1307 (see FIG. 13). A thumbnail 1402 is "YYY.JPG", and a thumbnail 1403 is "ZZZ.JPG".

As shown in the drawing, "Document1.html" is read, updated, and displayed in a "Document" frame 1308. "Picture1.html" is displayed in the portion 1404. "Picture1.html" instructs a resource obtained from the digital camera 30, which corresponds to the thumbnail "XXX.JPG", to be displayed in the "Picture" frame. "Document1.html" instructs document data scanned by the scanner, which corresponds to the thumbnail "XXX.JPG", to be displayed in the "Document" frame.

Similarly, in the case that a thumbnail corresponding to the portion 1605 is specified, the portion 1602 is executed. In the case that a thumbnail corresponding to the portion 1606 is specified, the portion 1603 is executed.

In the case that the portions 1401 to 1403 are specified in this manner, images captured by the digital camera 30, which correspond to the associated thumbnails, are read and displayed one at a time in the portion 1404. At the same time, a portion 1405 displays scanned document corresponding to the specified thumbnail.

As has been described above, the MFP device 10 serving as an exemplary image-forming apparatus communicating with the digital camera 30 serving as an exemplary peripheral device is disclosed. The MFP device 10 has a scanner serving as a scanning unit arranged to scan a document. A combined data generator 2006 serving as an exemplary generator configured to generate data, which is generated by scanning a document by the scanner, is stored in the image-forming apparatus.

A data generator serving as an exemplary obtaining unit configured to obtain data held by the peripheral device is stored in the image-forming apparatus. The image-forming apparatus includes a forming program serving as an exemplary forming unit configured to form display data for displaying the generated data in association with the data obtained from the digital camera 30. The display data formed by the forming program may be sent to an information-processing apparatus serving as an exemplary external information-processing apparatus.

A sending unit may be a sending program. The forming program and a generating program correspond to the display data generator 1008. An obtaining program corresponds to the wireless-communication controller 1004. The sending program corresponds to the email sender 1011.

The forming program forms a structured document in which document data scanned by the scanner and image data received from the digital camera 30 are associated with each other as display data.

The forming program may also function as a thumbnail generator configured to generate a thumbnail of image data obtained from the peripheral device.

The forming program may also function as a data generator configured to generate a page showing a list of thumbnails generated by the thumbnail generator. On the basis of the display data, one of displayed thumbnails is specified. Thereafter, a page including data corresponding to the specified thumbnail, which is obtained from the digital camera 30 or which is read by the scanner, may be formed.

The peripheral device is a digital camera serving as an exemplary image-pickup device. The MFP device 10 serving as an exemplary image-forming apparatus is preferably a multifunctional apparatus having a scanner. Establishment of communication between the digital camera 30 and the MFP device 10 is awaited. In response to establishment of communication, a user interface for allowing the user to select an image obtained from the image-pickup device may be displayed on a display connected to the image-forming apparatus. The operation unit is an exemplary display unit.

The user interface preferably has an instruction unit configured to allow entry of an instruction to associate an image read from the digital camera 30 with data scanned by the scanner.

The forming program may generate, as display data, an HTML document including link information indicating generated data and link information indicating data obtained from the peripheral device.

According to the embodiment, data can be saved in a server on the Internet or Intranet without using a PDA. Thus, information can be easily shared in an environment where no infrastructure exists, such as when the user is not in the office.

Furthermore, the user may save additional comments or reports regarding data to be saved and shared in association with the data. Therefore, detailed information regarding the data can also be shared. For example, at magazine and book publishing offices, written comments or reports on photographic data captured outside the office may be saved in association with the photographic data. In addition, by using the embodiment of the present invention, reports about photographic data captured at a construction site or an accident site can be written at the site, and the written report can be saved in association with the photographic data.

According to the data combining/registration system of the embodiment of the present invention, a user can use the system without paying attention to the folder structure in the document management service or the like. Since a URL indicating the location of the result of combining photographic data with a scanned image is automatically generated and presented to the user, the user need not perform complicated document management and organization.

According to the data combining/registration system of the embodiment of the present invention, the result of combining photographic data with a scanned image is saved as an HTML document. Therefore, the user is not required to have a special application for browsing the result. The result can thus be browsed using a browser already installed in a client PC. Since the combined result is the HTML document, the photographic data and the scanned image can be easily downloaded to the client PC for reuse.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Application No. 2006-173624 filed Jun. 23, 2006, which is hereby incorporated by reference herein in its entirety.

What is claimed is:

1. An image-forming apparatus communicating with a peripheral device, comprising:

a scanning unit configured to scan a document;

a first generator configured to generate document data corresponding to the document scanned by the scanning unit;

an obtaining unit configured to obtain image data held by the peripheral device;

a thumbnail generating unit configured to generate one or more thumbnails of image data obtained from the peripheral device and one or more thumbnails of the document data generated by the first generator;

a display unit configured to display an image selection screen for selecting the image data obtained by the obtaining unit and to display a drag-and-drop screen for associating the image data with the document data, wherein thumbnails of the image data and the document data are displayed on the drag-and-drop screen and the image data is associated with the document data by dragging the thumbnail of the document data onto the thumbnail of the associated image data;

a script generating unit configured to generate a script which is associated with the thumbnail of the image data and when executed will display the associated image data and the associated document data at the same time;

a document generating unit configured to insert the generated script into an XML structured document which includes programing code for displaying the one or more thumbnails of the image data, programing code to generate a display area to display the image data, and programing code to generate a display area to display the associated document data, wherein when the programing code in the document is executed and a user selects one of the thumbnails, the script associated with the thumbnail is executed and the image data associated with the thumbnail is displayed in the image data display area and the associated document data is displayed in the associated document data display area; and a sender configured to send a reference associated with the document to an external information-processing apparatus, wherein when the external information-processing apparatus processes the reference, the programing code in the document is executed.

2. An image-forming apparatus according to claim 1, wherein the XML structured document is a hypertext markup language document including link information indicating the data generated by the first generator and link information indicating the data obtained by the obtaining unit from the peripheral device.

3. An image-processing method for an image-forming apparatus communicating with a peripheral device, the method comprising:

scanning a document;

generating document data corresponding to the scanned document;

obtaining image data held by the peripheral device;

generating one or more thumbnails of image data obtained from the peripheral device and one or more thumbnails of the document data generated by the first generator;

displaying an image selection screen for selecting the image data obtained by the obtaining unit and to display a drag-and-drop screen for associating the image data with the document data, wherein thumbnails of the image data and the document data are displayed on the drag-and-drop screen and the image data is associated with the document data by dragging the thumbnail of the document data onto the thumbnail of the associated image data;

generating a script which is associated with the thumbnail of the image data and when executed will display the associated image data and the associated document data at the same time;

inserting the generated script into an XML structured document which also includes programing code for displaying the one or more thumbnails of the image data, programing code to generate a display area to display the image data, and programing code to generate a display area to display the associated document data, wherein when the programing code in the document is executed and a user selects one of the thumbnails, the script associated with the thumbnail is executed and the image data associated with the thumbnail is displayed in the image data display area and the associated document data is displayed in the associated document data display area; and sending a reference associated with the document to an external information-processing apparatus, wherein when the external information-processing apparatus processes the reference, the programing code in the document is executed.

4. An image-processing method according to claim 3, wherein, in the generating step, the script is inserted into a hypertext markup language document including link information indicating the generated data and link information indicating the data obtained from the peripheral device.

5. A non-transitory computer-readable storage medium storing a control program for allowing a computer to execute an image-processing method for an image-forming apparatus communicating with a peripheral device, the method comprising:

scanning a document;

generating document data corresponding to the scanned document;

obtaining image data held by the peripheral device;

generating one or more thumbnails of image data obtained from the peripheral device and one or more thumbnails of the document data generated by the first generator;

displaying an image selection screen for selecting the image data obtained by the obtaining unit and to display a drag-and-drop screen for associating the image data with the document data, wherein thumbnails of the image data and the document data are displayed on the drag-and-drop screen and the image data is associated with the document data by dragging the thumbnail of the document data onto the thumbnail of the associated image data;

generating a script which is associated with the thumbnail of the image data and when executed will display the associated image data and the associated document data at the same time;

inserting the generated script into an XML structured document which also includes programing code for displaying the one or more thumbnails of the image data, programing code to generate a display area to display the image data, and programing code to generate a display area to display the associated document data, wherein when the programing code in the document is executed and a user selects one of the thumbnails, the script associated with the thumbnail is executed and the image data associated with the thumbnail is displayed in the image data display area and the associated document data is displayed in the associated document data display area; and sending a reference associated with the document to an external information-processing apparatus, wherein when the external information-processing apparatus processes the reference, the programing code in the document is executed.

* * * * *